(12) United States Patent
Hartman et al.

(10) Patent No.: US 8,144,931 B1
(45) Date of Patent: *Mar. 27, 2012

(54) REAL TIME CORRELATOR SYSTEM AND METHOD

(76) Inventors: Richard L. Hartman, Huntsville, AL (US); Michael K. Balch, Madison, AL (US); Keith B. Farr, Madison, AL (US); Matthew A. Kliesner, Madison, AL (US)

( * ) Notice: Subject to any disclaimer, the term of this patent is extended or adjusted under 35 U.S.C. 154(b) by 502 days.

This patent is subject to a terminal disclaimer.

(21) Appl. No.: 12/431,727

(22) Filed: Apr. 28, 2009

Related U.S. Application Data

(63) Continuation-in-part of application No. 10/831,587, filed on Apr. 22, 2004, now Pat. No. 7,526,100.

(51) Int. Cl.
*G06K 9/00* (2006.01)
*H04N 5/225* (2006.01)
(52) U.S. Cl. ........................ 382/103; 348/169
(58) Field of Classification Search .................. 382/103, 382/107, 236; 348/169, 170, 172, 208.14; 725/12

See application file for complete search history.

(56) References Cited

U.S. PATENT DOCUMENTS

| | | | |
|---|---|---|---|
| 7,505,608 B2 * | 3/2009 | Portigal et al. ............... | 382/103 |
| 7,505,609 B1 * | 3/2009 | Hartman et al. ............... | 382/103 |

OTHER PUBLICATIONS

Chien-Ping Lu et al, Fast and globally convergent pose estimation from video images, ieee transactions on pattern analysis and machine intelligence, vol. 22 No. 6, Jun. 2000 US, pp. 610-622.
Hannah, SJ, A relative navigation application of ULTOR technology for automated rendezvous and docking, proceedings of spie, howard, rt and richards rd, vol. 6220, May 19, 2006, pp. 662200E1-662200E12.
Balch, M et al, A pose and position measurement system for the hubble space telescope servicing mission, proceedings of spie, howard rt and richards rd, vol. 6555,May 3, 2007, pp. 65550F-1-65550F-8.
BVK Vijaya Kumar, Tutorial survey of composite filter designs for optical correlators, applied optics, vol. 31, No. 23 Aug. 10, 1992, US, pp. 4773-4800.

* cited by examiner

*Primary Examiner* — Abolfazl Tabatabai
(74) *Attorney, Agent, or Firm* — Mark Clodfelter

(57) ABSTRACT

A real time digital correlation system is disclosed. Reference filters are constructed to define a region of filter space, and filters may be predictively selected based on a trajectory of selected filters through the filter space. In some instances, selected features of a spacecraft are selected for correlation to produce full 6DoF information. In other instances, portions of a correlation target are selected for correlation to produce 6DoF information. Digital filters of the invention are preferably 4-bit filters, and use unique mapping algorithms to map phase and intensity information from larger images, such as 12, 16, 32 and 64 bit images, to the 4-bit format.

31 Claims, 21 Drawing Sheets

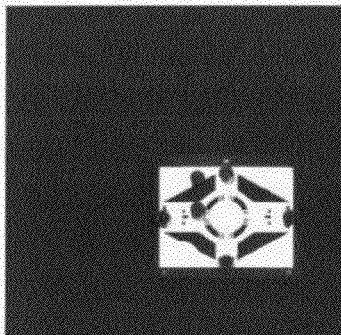
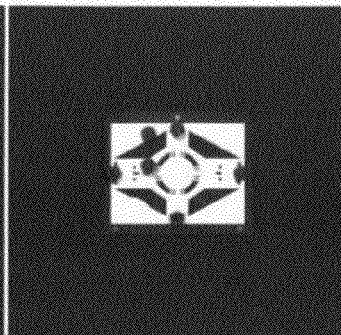
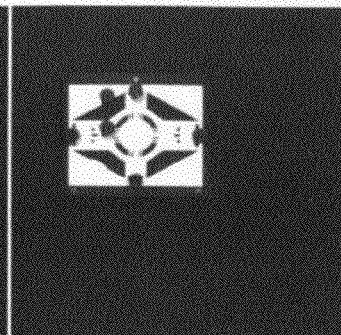
FIG. 10          FIG. 11          FIG. 12
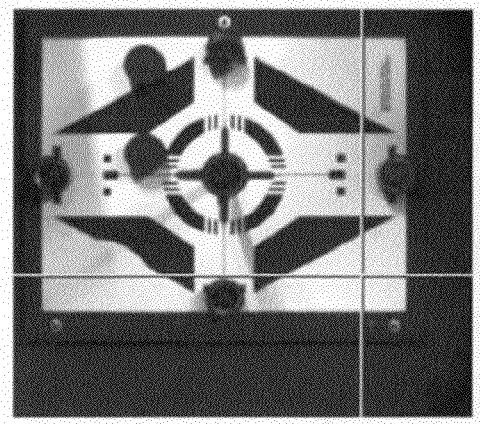
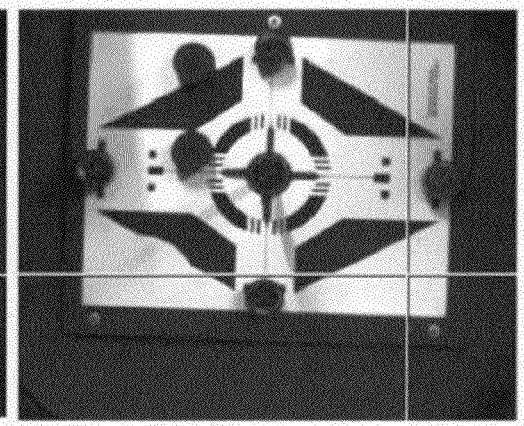
FIG. 13          FIG. 14
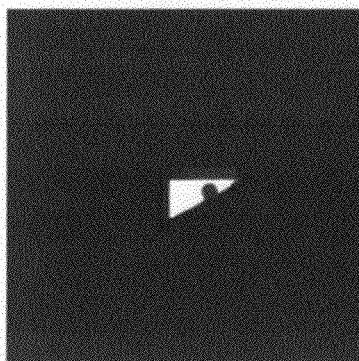
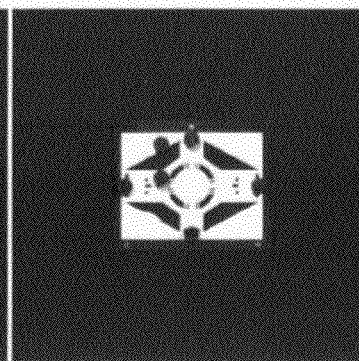
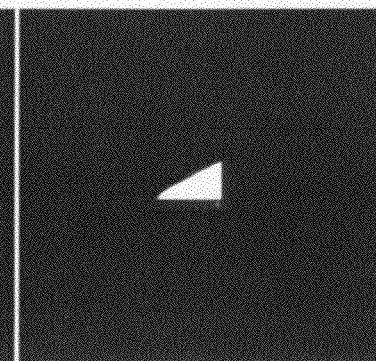
FIG. 15          FIG. 16          FIG. 17

US 8,144,931 B1

REAL TIME CORRELATOR SYSTEM AND METHOD

CROSS REFERENCE TO RELATED APPLICATIONS

This application is a continuation-in-part application of pending U.S. application Ser. No. 10/831,587, filed Apr. 22, 2004, which is hereby incorporated in its entirety herein by reference, and which in turn claims the benefit of U.S. provisional patent application Ser. No. 60/464,479, filed Apr. 22, 2003, also hereby incorporated herein in its entirety by reference.

FIELD OF THE INVENTION

This invention relates generally to apparatus and methods for performing correlations, and particularly to correlation systems that combine full-frame correlations with feature-based correlations and multiple feedback schemes to produce a correlation system sufficiently accurate to acquire and track an object of interest in real time, i.e. on the order of 15 ms from obtaining an image to providing a result.

BACKGROUND OF THE INVENTION

There is a significant body of work related to the design of the optical processor assembly of optical correlators, and especially on the theory of designing the reference image filters that some correlators use. A typical scientific paper on a correlator describes a spot of light, or a three-dimensional plot of the spot, and does not solve any real problem. The large body of literature on reference filter design addresses optimization of a variety of internal correlator functions, such as light efficiency, but fails to address any optimization in terms of the application of a correlator to a real-world problem.

In addition, many correlation systems are known, for example those discussed in "OPTICAL PROCESSING", by one prominent authority in the field, Anthony VanderLugt. Mr. VanderLugt teaches a variety of correlators. He also teaches the potential of post-processing of the correlation plane. Another recognized authority in the field, J. Horner, teachers a combination of one specific preprocessor and a correlator. However, to Applicant's knowledge, no one has sought to optimize correlator systems to produce a viable real-time correlation system that can efficiently acquire and track one or more objects of interest in real time.

The correlation systems discussed by Mr. VanderLugt are optical correlators, and the Applicant's system is based on a real-time digital correlator. An optical correlator uses a series of optical lenses, a laser, cameras, and spatial light modulators to perform correlation between a filter and an image. A digital correlator is completely implemented in digital hardware such as Field Programmable Gate Arrays (FPGAs) and Central Processing Units (CPUs). A camera or other sensor is used to acquire and convert to digital form an image, and then all further processing is done digitally. Optical based correlators are notoriously hard to align and maintain because of the extreme alignment requirements for them to function properly. Optical correlators also require an assembly of optical and electronic elements to function properly, which can be difficult to build into a system for the military or for use in space. On the other hand, digital correlators can be implemented simply as a camera and a digital circuit card assembly. They also require no tedious alignment for proper operation.

Many practical applications of a correlator, such as an image recognition and tracking capability, require continuous, real-time tracking of the location of the recognized target or object of interest, for example tracking of an aircraft or missile in flight, or an automated docking maneuver between two spacecraft. Recognition capability requires that the correlator system provide, in real time, the parameters of range, bearing and orientations of the object of interest such as roll, pitch and yaw. In addition, it is desirable that the correlation system provides feedback to the camera or other sensor in order to control at least contrast, gamma, gain and brightness of the obtained image in order to maximize correlation peaks. In some instances it is further desirable to provide feedback related to camera direction control or pointing of the camera, such as pan and tilt or maneuvering of an object or spacecraft, in order to automatically maintain the object or view of interest generally centered in the field of view of the camera. Where docking maneuvers are undertaken, the camera or cameras providing imagery may be fixed to the apparatus or spacecraft, and the entire apparatus or spacecraft moved to maintain a view of the target. In other applications, a camera or other sensor mounted to a spacecraft may be mounted on some form of apparatus, such as a gimbal, that allows the camera to be moved to maintain a view of the object or field of view of interest.

Presently developed video processing systems and algorithms that measure distance, direction and orientation of an object typically have required a special cooperative target to be placed on the object of interest to aid in acquisition and tracking. These algorithms must be provided with very specific features, such as edges or spots in a particular pattern, in order to be successful. However, relying on a very specific feature for successful tracking is very limiting, especially with respect to spacecraft already in orbit due to inability to retrofit the spacecraft with the desired targeting markings or features.

Some systems also require large databases of correlation filters consisting of all possible target views that might be imaged by the sensor, to properly determine distance, direction and orientation of the target. However, such large databases of correlation filters requires a correspondingly large memory store of filters, which may require thousands to hundreds of thousands of filters. Such a large filter library is generally unfeasible with respect to available memory on a spacecraft, and requires significant lengths of time to search through in order to find the appropriate filter. Such a system in general is not feasible for spacecraft docking and other applications due to inability to provide real-time correlation information and the requirement for large filter stores.

BRIEF DESCRIPTION OF THE DRAWINGS

FIGS. 10, 11 and 12 each show a background of the docking target at different aimpoints.

FIGS. 13 and 14 show a correlation point represented as crosshairs on a corner of the docking target.

FIGS. 15, 16 and 17 show portions of the docking target as they would be used to determine at least pose of a spacecraft.

DETAILED DESCRIPTION OF THE DRAWINGS

Figure 1:
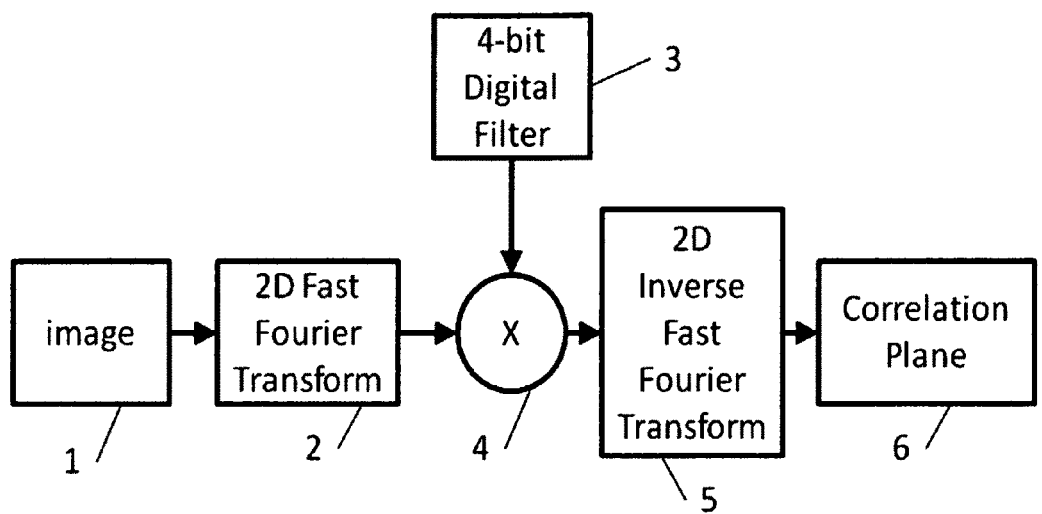
FIG. 1 is a block diagram of a digital correlator.

Applicants provide a digital real-time correlation system using full frame correlations, feature-based correlations and which employ a plurality of feedback systems for controlling a sensor. The sensor may be a video camera, or any other sensor such as an infrared camera, laser radar, synthetic aperture radar, a hyperspectral sensor or any other sensor that creates a 2 or 3 dimensional representation or image of a target. Feedback systems of the present invention include feedback for controlling an iris setting of a lens, controlling a zoom setting of the lens, adjusting gain, brightness, gamma, contrast, and controlling pointing of the camera to keep the camera pointed or centered at the object/features of interest.

Applicants full frame and feature-based system determines distance from the target, direction, and yaw, pitch and roll, these latter three together being designated hereinafter as "pose". All these parameters are determined only from visual imagery of the target. A digital correlator generates a correlation peak when the obtained image matches or generally matches an image of a plurality of images in a correlation filter. The location of this correlation peak gives information about the location of the target in the sensor field of view. The intensity of the correlation peak gives information about the degree of similarity between the imaged target and a correlating image in the filter.

Typically, a single filter will contain many training images, as will be further explained. A filter made using an image of an entire target will determine the location in the cameras field of view of that target. A filter made using only a subset or portions of the target, or unique features of the target, will track the location of these unique features in the camera's field of view. Multiple filters, each made from separate unique features of the target, track the location of those unique features in relation to each other. Intelligently selected unique features makes it possible to accurately calculate distance, direction, and pose information based on the correlation peak locations of such generated filters. For example, the square regions in FIG. 1a, taken of one end of the Hubble Space Telescope, shows features that may be relied on for correlation during a docking maneuver. Positions of these features are provided to the N-point algorithm, as will be further explained, in order to determine parameters of an approaching spacecraft with respect to the Hubble Telescope. Correlation peak location information, combined with precise x, y, and z knowledge of the target structure, yields target distance, direction, and pose through use of an N-point inverse projection algorithm, such as algorithms generally described in a paper by Chien-Ping Lu et. al., IEEE Transactions On Pattern Analysis and Machine Intelligence, Vol. 22, No. 6, June 2000, which is incorporated herein by reference in its entirety.

Filter Creation

Preparatory to describing the full frame and feature based portion of Applicants correlation system, processes used to make filters will be described. A description of converting a full resolution complex correlation filter to a 4-bit digital correlation filter follows. A single, full complex composite filter is made using portions of the compromise composite algorithm as described in "A Tutorial survey of composite filter designs for optical correlators" by B. V. K. Vijaya Kumar, and which is incorporated herein by reference in its entirety. Specifically, section 4G of his paper, entitled "Compromise Composite Filters", describes an optical filter making strategy upon which Applicants base a portion of their digital filter creation. The compromise composite filter is a compromise between the Mean Variance Synthetic Discriminant Function (MVSDF) and the Minimum Average Correlation Energy (MACE) filters. A parameter, alpha, is used to control which of the two filters, MVSDF or MACE, the compromise filter is most like. After trying a range of values, an alpha value of 100 was typically found to be a good choice. However, this value can be optimized per target and filter for optimum performance.

Figure 1A:
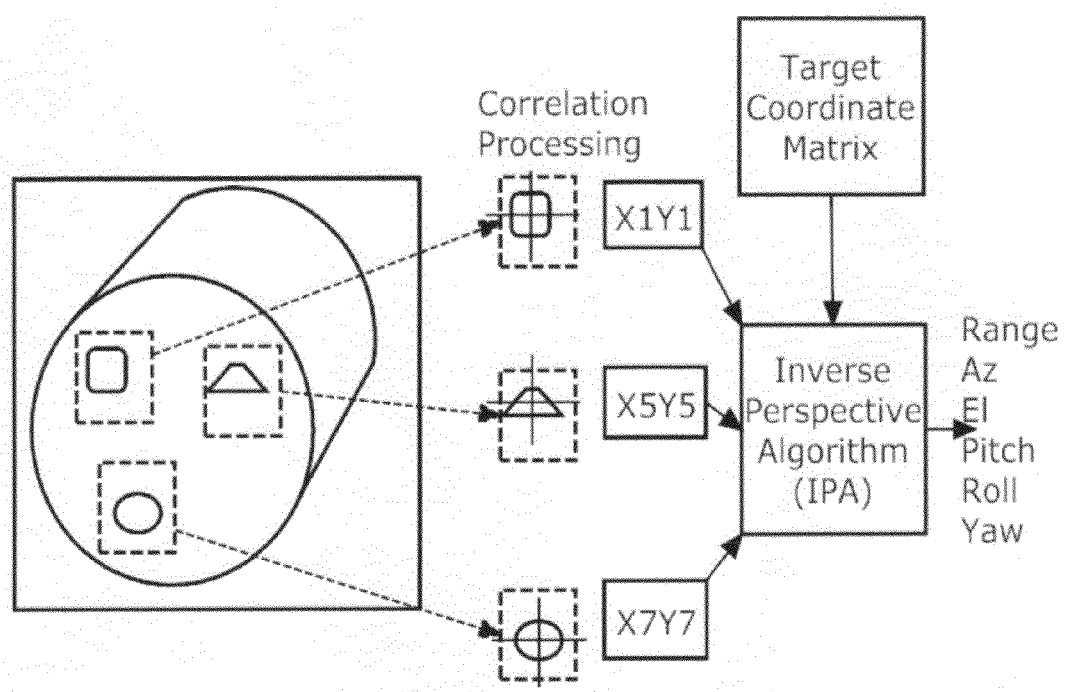
FIG. 1a is a diagram illustrating a selection of location of existing features on a spacecraft for correlation, and control of an approaching spacecraft.

To explain the function of a 4-bit filter, FIG. 1 shows a block diagram of a digital correlator. Block 1, an image, is captured from a sensor and can be, for example, 256×256 pixels. This image is processed with a 2D Fast Fourier Transform (FFT) in Block 2. The FFT finds the frequency components of the image and codes this into a 256×256 element matrix. Each element of this matix represents a particular frequency component of the image. Block 3 is the 256×256 element 4-bit digital filter. This filter has been created in such a way, that, when it is multiplied element by element in Block 4 with the output of Block 2, and then processed with an Inverse Fast Fourier Transform (IFFT) in Block 5, a correlation plane, Block 6, containing a correlation peak identifying the location of a target is created. In Block 4, the 4-bit digital filter is essentially modifying the phase and amplitude of the FFT processed image, to create a correlation peak of the target in the correlation plane.

A 4-bit digital filter includes a matrix of, for example, 256×256 values. Each of these values, for the filter to be complex, must be represented by a complex number, or A+Bi, where A is a real number, and B is an imaginary number. An equal representation of each element would be with alpha amplitude and beta phase. In order for a digital filter created using optical principles of the Kumar reference to be used in a digital correlator, it must be represented by a number of bits of information having digital values. An easy way to do this would be to use a high precision number, for example 32 or 64 bits, for the real and imaginary values of each element in the 4-bit digital filter. However, digital filter elements with this many bits each would make the size of each filter very large in terms of memory required to store the filter. In Applicants system, memory space is limited, so it is desirable to reduce the required memory size of each filter. Processing time would also be very long if a 32 or 64 bit filter were used. Intelligently choosing one of 16 digital values for each pixel, which can be described by 4 bits, in the complex plane to map each pixel of the composite filter value dramatically reduces the memory size of the filter, dramatically increases processing speed, and reduces computational overhead. The 4-bit filter also provides good performance in the digital correlator. As noted elsewhere herein, up to 128 training images may be packed into a single 4 bit filter array of 256×256 pixels.

Figure 1B:
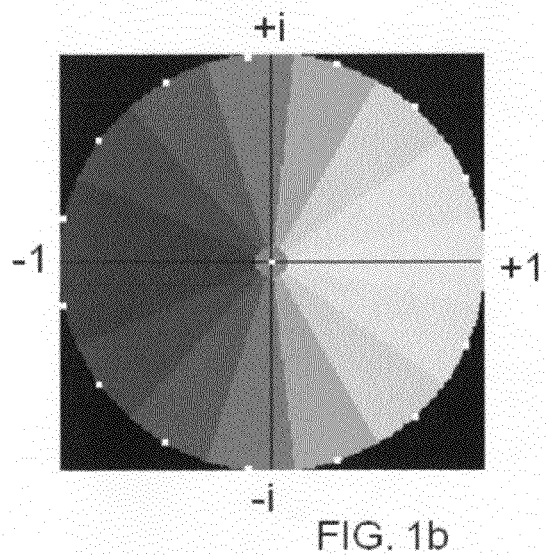
FIG. 1b is an illustration demonstrating how a mapping algorithm is performed in order to reduce pixels of digital correlation filters to 4 bits.

A description of the mapping of high precision complex numbers, such as 32 or 64 bits, of a correlation filter constructed of many training images, to a corresponding 4-bit digital filter of lower precision is as follows. FIG. 1b is a graph used to associate 16 lower precision complex digital numbers, described by 4 bits, with the high precision complex numbers of the original digital filter. In other words, FIG. 1b represents mapping of a higher precision complex digital number of a single pixel, such as 12, 16, 32 or 64 bits, into a 4 bit complex digital number for that pixel of the 4-bit filter. Another way to think of this is the concept of rounding in the complex plane. Rounding is typically used to take very high precision numbers, such as 1.58 and 9.47 and convert them to simpler numbers such as 2 and 9. This is the normal case of using rounding with real numbers. Applicants have found that this concept can also be applied to complex numbers in the complex plane. The original complex filter, which as stated may be a 256×256 pixel filter (65,536 total pixels,) is constructed wherein each pixel is digitally represented by high precision numbers of large magnitude, such as 32 or 64 bits. Each of these high precision values for each pixel can fall anywhere in the complex plane. Applicants intelligently select 16 values (represented by 4 bits) in the complex plane, as shown in FIG. 1b and table 1, and map each of the 65,536 high precision complex numbers, one high-value complex number per pixel, to a respective lower value (4 bit) complex number of the selected 16 values. While the resulting filter is still a 256×256 filter with 65,536 pixels, each pixel is now represented by only 4 bits that describe its value in the complex plane. Thus, where the original filter would require 262,144 bytes of storage for a 32 bit filter, the new filter requires only 32,766 bytes for storage. This mapping is accomplished by intelligently selecting the complex numbers in the complex plane of the 4-bit filter, shown in FIG. 1b as white dots, to map, or round the higher precision complex numbers to. The gray shaded regions associated with each white dot represent values of high precision complex numbers in the unit circle, or complex plane, that are mapped to respective 4-bit complex numbers. The gray shaded regions each represent a 2D region of high precision complex numbers in the complex plane, such that when a high precision complex number falls in a particular shaded region, the high precision complex number is mapped to the value of the corresponding white dot in the complex plane. As stated, the white dots represent the 4-bit complex numbers in the complex plane that the high precision complex numbers that fall within a respective gray region are mapped to. The mapping shown in FIG. 1b has been found to be superior to other possible 4-bit mappings. In this mapping, there is a single value at the origin, or 0+0i. The remaining 15 values are evenly spaced around the unit circle. This is essentially a phase only filter with the addition of a single point at the origin of 0+0i. The term "phase only filter" means that this 4-bit mapping represents the phase of the original complex filter using 15 possible values, but only maps the amplitude of the original filter as a 0 or 1. Table 1 describes the actual 4-bit numerical values in hexadecimal, and their corresponding complex numbers in the complex plane.

TABLE 1

| 0 | 0.0000 + 0.0000i | 8 | −0.9781 + 0.2079i |
| 1 | 0.9135 − 0.4067i | 9 | −0.8090 + 0.5878i |
| 2 | 0.669 − 0.7431i | A | −0.5000 + 0.8660i |
| 3 | 0.3090 − 0.9511i | B | −0.1045 + 0.9945i |
| 4 | −0.1045 − 0.9945i | C | 0.3090 + 0.9511i |
| 5 | −0.5000 − 0.8660i | D | 0.6691 + 0.7431i |
| 6 | −0.8090 − 0.5878i | E | 0.9135 + 0.4067i |
| 7 | −0.978i − 0.2079i | F | 1.0000 + 0.0000i |

Figure 2:
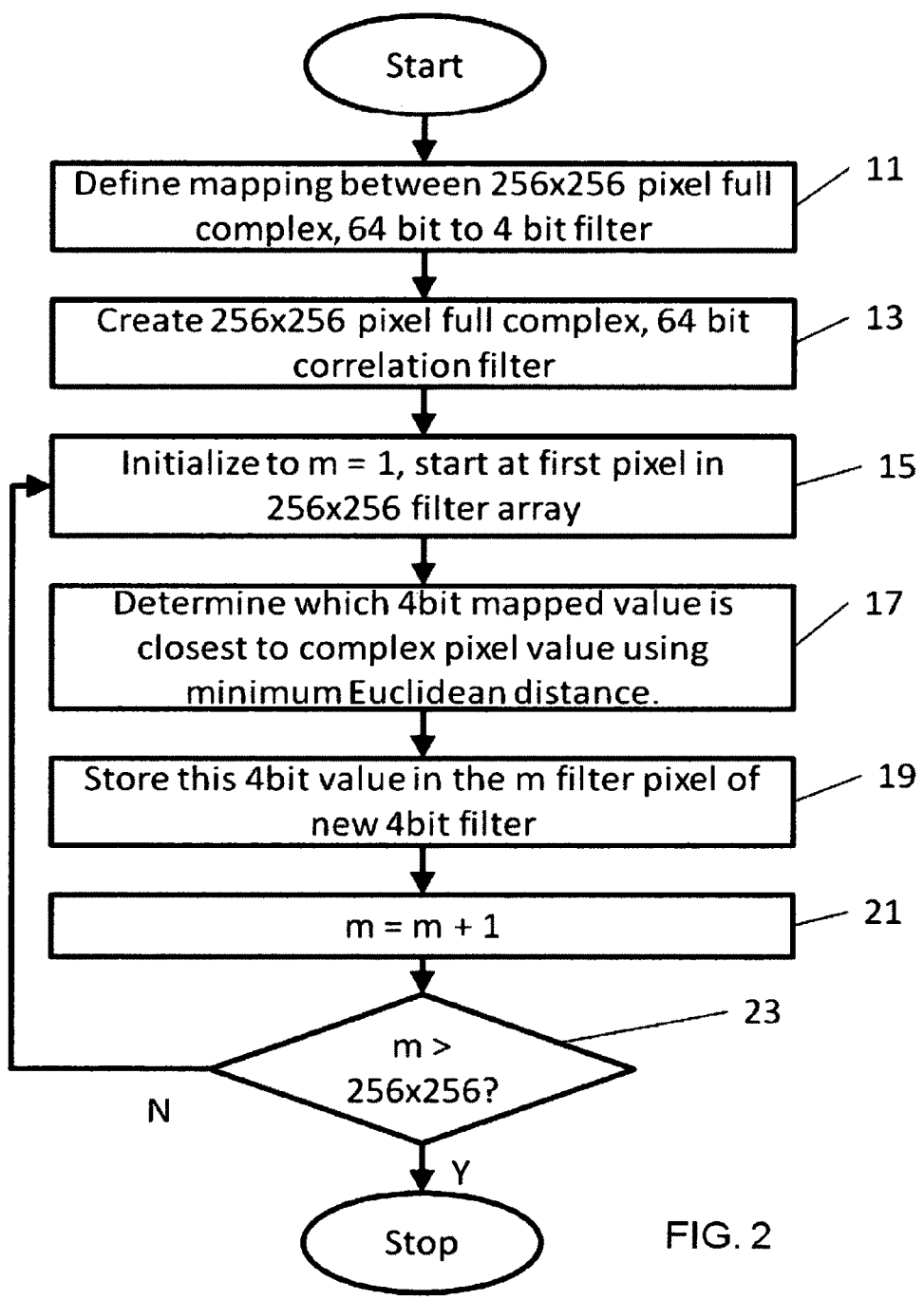
FIG. 2 is a flowchart of a filter creation process of the present invention.

A description of generating a 4-bit digital filter follows. FIG. 2 flowcharts the process of creating a 4-bit filter. Block 11 describes the process that was shown in FIG. 1 and Table 1, that of defining the actual mapping of the high precision complex numbers of the original complex filter to the complex, lower precision 4-bit digital filter. Block 13 is the process of creating the high precision complex filter. In Block 15, a single arbitrary filter pixel of the high precision filter, the m pixel, is selected for mapping. In Block 17, the m pixel is mapped according to FIG. 1 to the appropriate 4-bit value. For example, if the pixel value in the high precision composite filter is 9+0i, then value of this pixel would be mapped to a value of 1+0i, or the hex F 4-bit value shown in Table 1, because this is the closest point in the simplified complex plane. In Block 19 the 4-bit value (F) determined in the previous step is stored in the m location of the new 4-bit filter. Block 21 increments the m counter, and Block 23 determines whether the process has finished. If the process has finished, and at decision block 23, the algorithm proceeds to stop if all pixel values have been mapped, and if there are remaining pixel values to be mapped, then the algorithm loops back to Block 15 to begin with the next pixel. In this way, all high precision complex filter pixel values are mapped into the digital space represented by 16 values, or bits, which represent 16 points in the complex plane.

In the past, a brute force approach was used wherein a computer coupled to a correlator cycled through a plurality of filters designed to identify a target from a particular perspective until a strong correlation peak was achieved. However, as noted above, this approach required a large filter library, and could not provide the desired speed due to the requirement to search through a large numbers of filters, and perform a large number of correlations per second. As a result, filters and filter selection needed to be improved with an eye on efficiency and minimization of use of the necessary filters in order to reduce computing overhead.

In Applicant's system, composite filters are used rather than single-image filters. Where single-image filters are used, a sequence of filters are created wherein each filter contains an image taken from a viewpoint that is slightly different from a previous filter image. Thus, when searching for a correlation, each filter must be sequentially compared with an obtained image. As the sequence of filters approach similarity with the obtained image, correlation peaks begin to appear, with a highest correlation peak indicating the greatest similarity between the filter image and the obtained image. As noted above, problems with approach is the necessity for a large filter store and a large computational overhead. In addition, other problems include difficulty in interpolation and irregularities in correlation results that produce local maxima throughout a sequence of filters. On the other hand, and by way of example, a set of composite digital filters of Applicant's design, which each may contain up to 300 images or so, may each contain a range of images that include target sequences of an object of interest at sequential positions of range, roll, pitch and yaw. For example, a filter could be designed for determining attitude of a target using all images taken at 1 degree increments at pitch values from −2 to +2 degrees, roll values from −2 to +2 degrees, and yaw values from −2 to +2 degrees, at a range of 30 meters. As such, the filter would contain a total of 5×5×5×1 or 125 images. If similar filters for 31, 32, 33, 34, and 35 meters were made, each containing 125 images, a filter space of 5×5×5×5 is now defined. Filter space, as used herein, is a group of correlation filters organized in such a way that moving in one dimension through filter space is equivalent to the target moving in a single dimension, such as roll.

To completely determine all four parameters in this 5×5×5×5 filter space would take 5+5+5+5, or only 20 composite filters. To build single image filters for this same filter space would take 5*5*5*5=625 filters. A side benefit to using composite filters is a large reduction in total filter storage of 625/20, or a 31.25 to 1 reduction in storage requirements. Composite filters to cover larger filter spaces could be designed in a similar way; the only limitation being how many images can be packed into a single composite filter and it still being capable of responding in a predictable manner to a target falling within its particular area of filter space. Another benefit inherent in use of composite filters is that the number of correlations per update required to identify range, pitch, roll and yaw of a target is greatly reduced.

For single-image filters, a minimum number of filters to provide 4 dimensions of updates would require at least the center filter that provides the best correlation, plus and minus one filter in all four dimensions, and all the filters at the corners of the filter neighborhood. This would total 3×3×3×3=81 filters per update. In order to run at 5 Hz, this would require a correlator to perform 405 correlations per second. By comparison, if composite filters are used, the required correlations-per-update goes down to 3+3+3+3 or 12 filters per update. This would require a correlator to perform 60 correlations per second to provide 4 dimensions of updates at 5 Hz. This is a computational savings of 6.75 to 1.

It is to be noted that sets of five filters may be designed that are sensitive to any particular aspect, such as yaw, but insensitive to other aspects such as range, roll, and pitch. A filter made using an image of an entire target will determine the location in the camera's field of view of that target. Conversely, a filter made using only a subset of the target, or a plurality of unique features of the target, will track the location of those unique features in the cameras field of view. Multiple filters, each made from separate unique features of the target, track the location of those unique features in relation to each other. If the unique features are intelligently selected, it is possible to calculate full range, direction and pose information based on the correlation peak locations of such generated filters.

Figure 3:
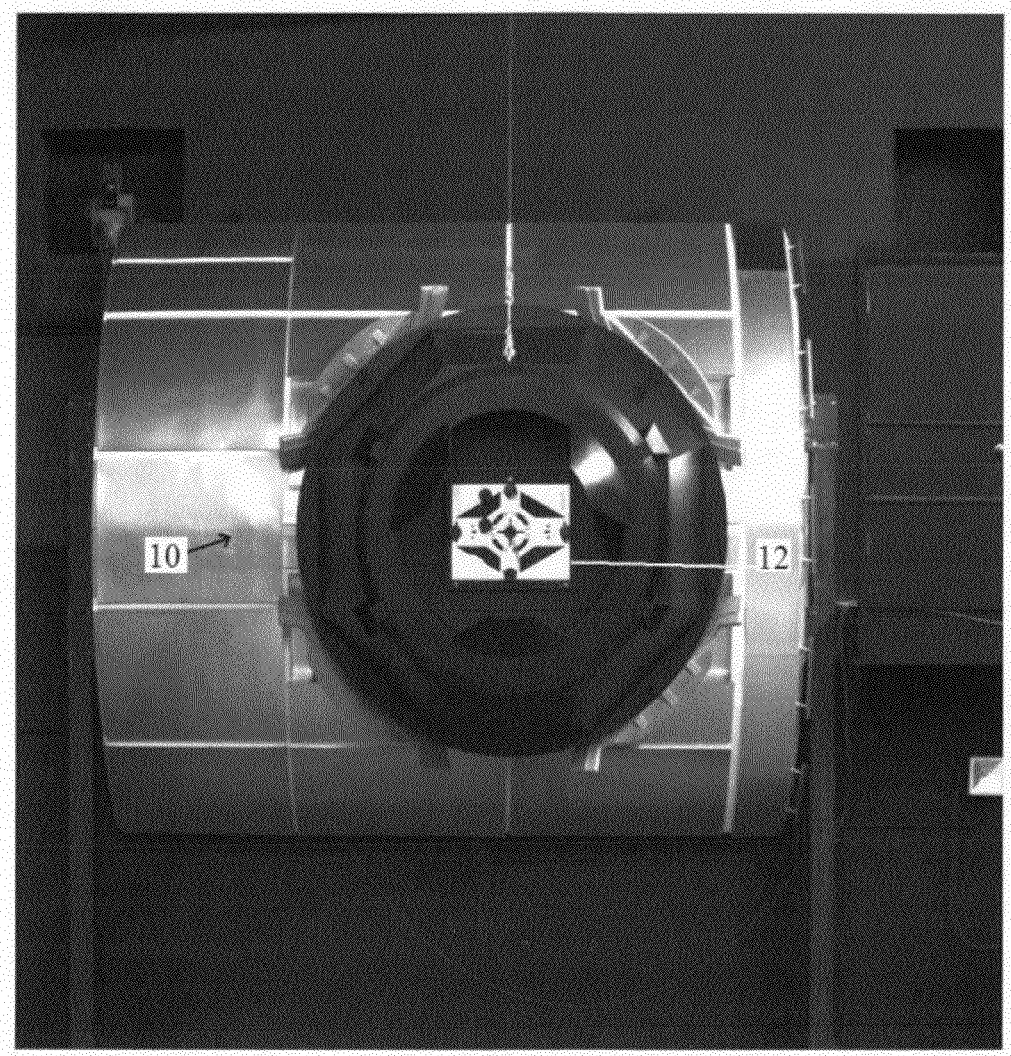
FIG. 3 is an image including a docking target for spacecraft.
Figure 4:
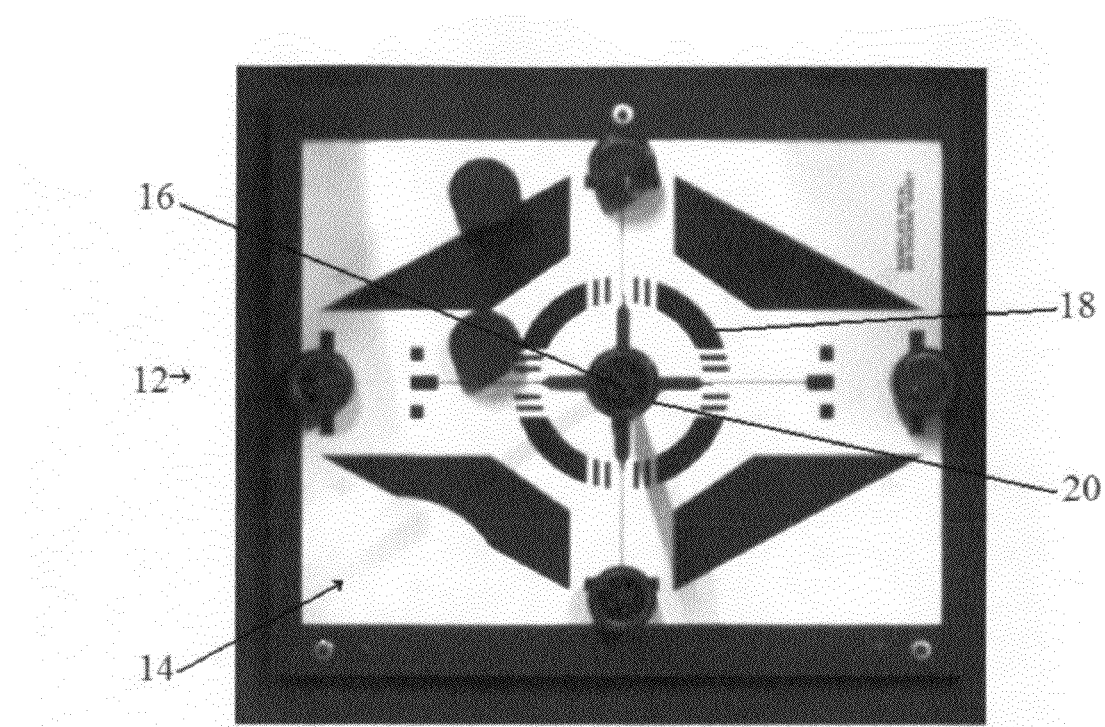
FIG. 4 shows details of the docking target of FIG. 3.
Figure 5:
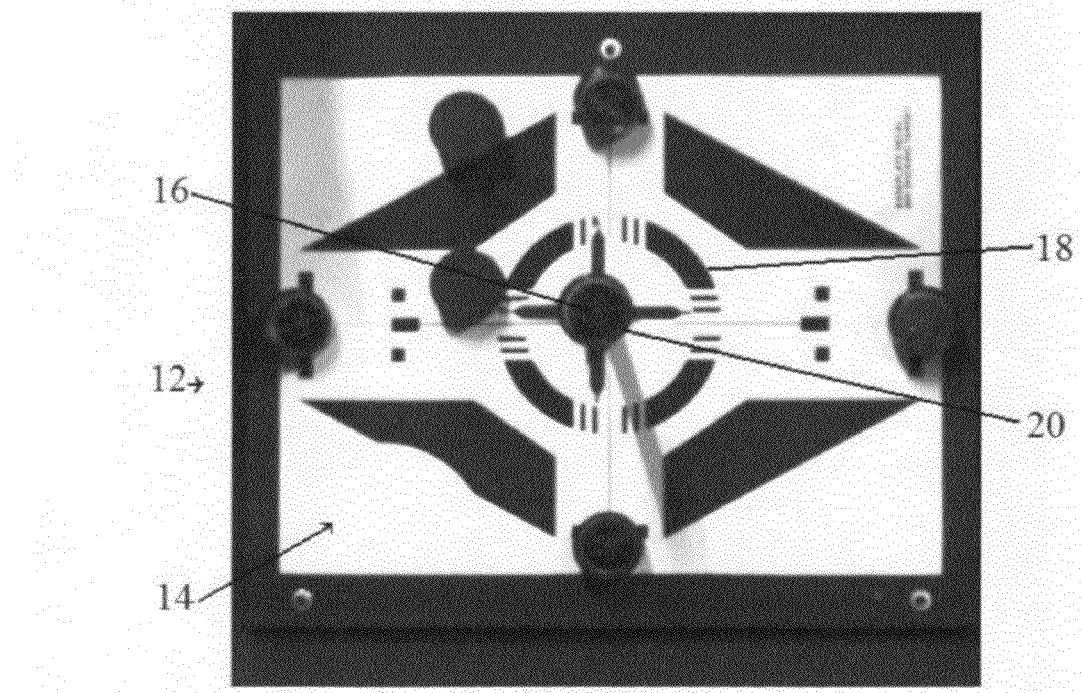
FIG. 5 shows how the docking target of FIG. 4 is shifted when viewed at an angle.

By way of example, FIG. 3 shows a mockup of a spacecraft dock 10 including a 6DoF docking target 12 at the center of dock 10. Docking target 12 is designed specifically to convey 6DOF information by visual examination. As shown in FIG. 4, docking target 12 has a flat background 14 with high contrast markings. A post extends from the center of target 12, and has a circle and cross 16 mounted at an end thereof. As the target changes in pitch and yaw, as seen from an approaching spacecraft, circle and cross 16 appears to move around within a high contrast circle 18 on background 14 and become off-center with respect to a circle 20 on background 14, circle 20 being the same size as circle 16. This is seen in FIG. 5, a view taken from a point displaced below and to the right 2 degrees from that of FIG. 4, and wherein circle 16 is no longer coaxial with circle 20.

Figure 6:
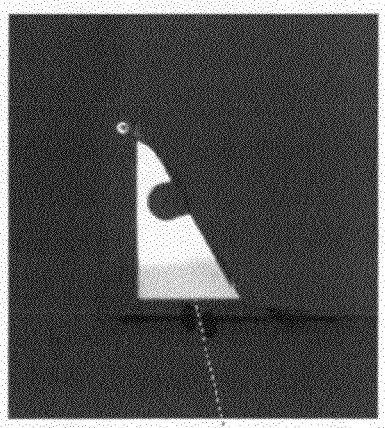
FIGS. 6, 7, 8 and 9 show portions of the docking target of FIG. 4.
Figure 7:
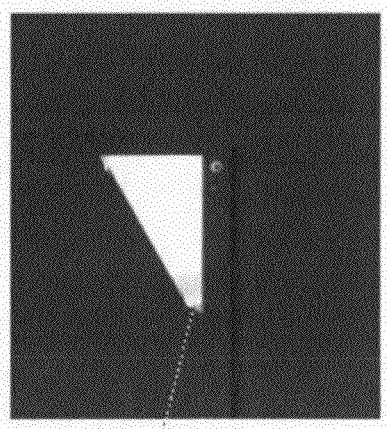
Figure 8:
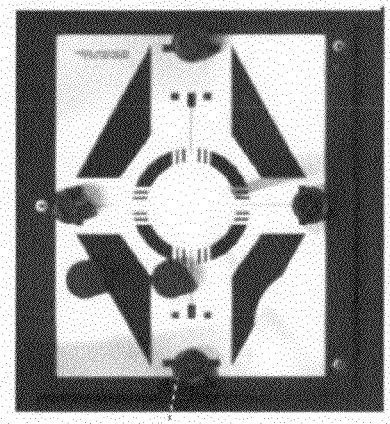
Figure 9:
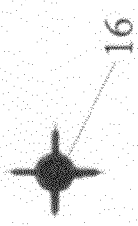

Full 6DOF information may be obtained by creating correlation filters of four unique features of the docking target, as shown by the features of FIGS. 6, 7, 8 and 9. FIGS. 6 and 7 are of the upper-left and lower-right corners 22, 24, respectively, of background 14 of the target. FIG. 8 is the target background 14 minus the center circle and cross, and FIG. 9 is of only the center circle and cross. Filters made including corner portions 22, 24 of the docking target cause correlation peaks from which both range and roll may be determined. Filters made with background 14 of FIG. 8 cause correlation peaks that allow determination of X and Y positions. Filters that include background 14 and the circle and cross 16 of FIG. 9 allow determination of pitch and yaw.

In experiments simulating an approach of one spacecraft to the docking target of another over a range of from 14 meters to 2 meters, a set of four 6DOF filters were created for every range from 14 to 2 meters, at a resolution of every tenth meter. A total of 480 filters were used. A filter progression algorithm simply loaded the appropriate four filters for the current range, correlated them against the currently obtained image, and a computer or computing apparatus implemented as hardware, such as an FPGAs circuit and associated components, calculates 6DOF pose based on simple geometric equations.

The equations used to determine X, Y, Range, Pitch, Yaw, and Roll can be obtained using an Inverse Perspective Algorithm or IPA. The IPA takes feature location information of where each feature is located in the camera FOV as well as X, Y, and Z information about how all target features are related to each other and produces distance, direction and pose.

While developing this system, a non-intuitive, fundamental filter property was observed. The correlation equations require two filters off axis from center to measure range and roll of the target. FIGS. 10, 11 and 12 show using the whole 6DOF background (minus the circle and cross) to make these filters, simply by offsetting the target to produce filter aimpoints in the upper left, center, and lower-right.

FIGS. 13 and 14 show correlation results (the correlation peak indicated at the center of the crosshairs) from using the filter of the lower-right of the target at 0 and 2 degrees roll. Intuitively, the correlation peak should follow the lower-right corner of the target as it rotates. In reality, the peak stays in the same location relative to the center of the target. If the target moves in X or Y, the peak follows, but if the target rotates (with X and Y not changing,) the correlation peak of this filter does not move. The actual location of the correlation peak is as if the target had not rotated at all. In other words, the correlation peak does not follow the feature it was centered on, but rather acts like an aimpoint offset of the entire cutout from which the filter was made. The peak seems to follow the center of mass of the target. This affect is also observed if the range of the target changes, causing the target to change in scale. Again, not intuitively, the correlation peaks do not follow the corners of the target; rather they stay put, making range calculation impossible.

FIGS. 15, 16 and 17 show new filters made in light of this realization. Instead of whole target filters for the upper-left and lower-right target filters (FIGS. 10, 12), only the dominant features in the respective areas of the target were used to make the filters. Now, as the range, or roll changes, correlation peaks associated with these respective features change either in distance or in angle, allowing for accurate calculation of range and roll.

Interpolation

Interpolating over a correlation peak to improve the accuracy of the detected peak location dramatically improves performance. Because of the limited resolution of the imager, peak location is limited to the size of a pixel. By looking at the shape of the correlation peak, more accurate information about peak location can be determined. If two adjacent pixels have nearly the same energy, then the true correlation peak is likely located halfway between the two pixels. If the two pixels on either side of the correlation peak have nearly the same energy, then the peak is likely located at the center pixel. Because a correlation peak is actually two dimensional, the interpolation is done across a surface. In addition, the base 2 logarithm of the pixilated peak is used for interpolation instead of the raw data. This has been shown to improve the accuracy of the interpolation because of the exponential nature of the correlation peak. In summary, to calculate the interpolated correlation peak location, the scene and filter are correlated and the maximum pixel value is located. The base 2 logarithm of the nine pixels around the correlation peak is taken, and 2D bicubic interpolation is used to improve accuracy of correlation peak location. A second way to achieve the same results is simply to calculate the centroid of the pixels making up the correlation peak. The centroid also gives sub-pixel accuracy of the true correlation peak location.

Filter Search Algorithms

In order to obtain "real time" correlations, on the order of 15 milliseconds as noted above, it is necessary to reduce the number of filters that need to be correlated to a minimum. Here, Applicants have developed predictive search algorithms that reduce the number of filters that are searched to a minimum. In order to achieve true 6 DoF identification and tracking, these algorithms predictively search a 4 dimensional filter space.

Imagine a set of filters generated by incrementally changing range, roll, pitch, and yaw of a target. This would create a four dimensional filter space. In order to track current location and predict future location of the target in filter space, a trajectory indicating past positions, current position and velocity can be drawn through the filter space.

Figure 18:
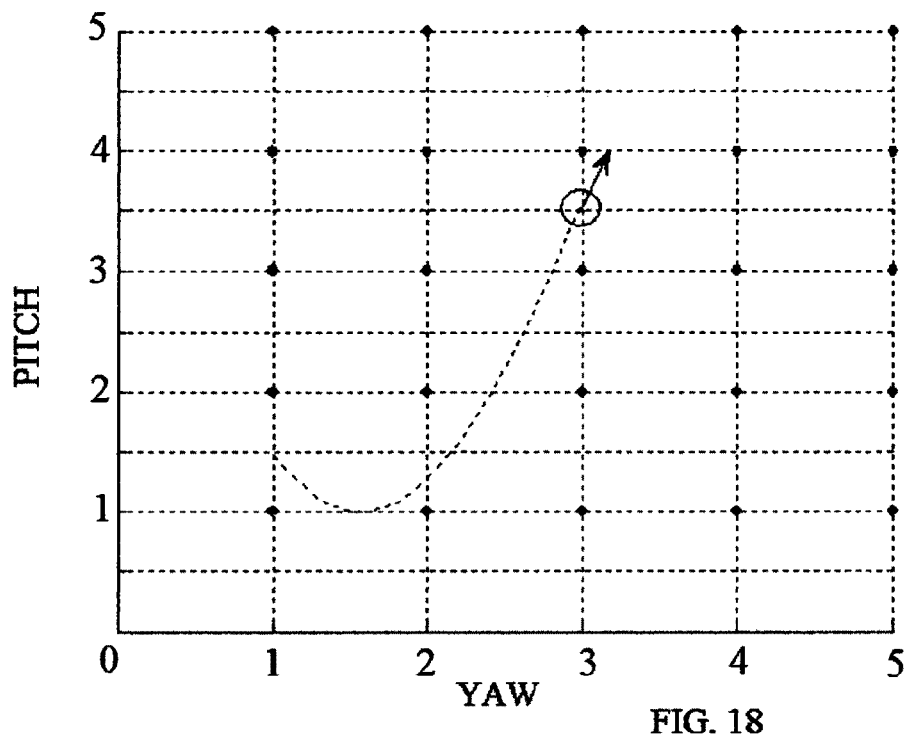
FIG. 18 shows a 2-dimensional representation of filter space containing a plurality of sequential filters for pitch and yaw, and a filter trajectory represented as a curved arrow through the filter space.
Figure 19:
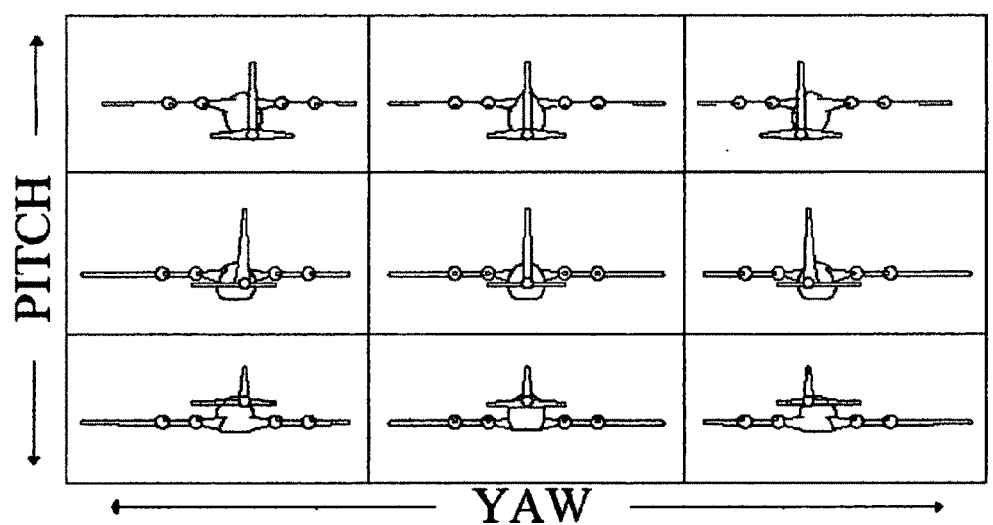
FIG. 19 shows a graphical representation of the filters making up the filter space of FIG. 18.

FIG. 18 shows such a filter space for two dimensions, in this case pitch and yaw. The dark dots each represent locations in filter space for which a correlation filter has been created. FIG. 18 covers 1 to 5 degrees of yaw and 1 to 5 degrees of pitch. FIG. 19 demonstrates this concept using an aircraft. As one moves from left to right in FIGS. 18 and 19, the aircraft from which the filters were made would yaw nose right. As one moves from top to bottom in the figure, the aircraft would pitch nose down. In FIG. 18, the curved dashed line, the filter progression trajectory, represents a history of the filters that had the strongest correlation peak as the target moves through filter space. The circle represents the last known location of the target in filter space, and the arrow is an extrapolation predicting future motion of the target through filter space.

Several methods can be used to predictively select the next set of filters to be used, i.e. in the direction of the arrow in FIG. 18, to search for the next predicted target pose. One method is to use the last known target position as the "center" filter in a neighborhood of filters to be searched. The size of the neighborhood is determined by maximum speed of the target along the dimensions represented in filter space, as well as user confidence in the selected filter/filters ability to identify the correct orientation of the target. If information about limits of target motion is known, such as turning radius and maximum velocity, boundaries can be placed on the search volume. A second method is to choose the next center filter based on a prediction of where the target will be. A simple curve fit can extrapolate where the target should be in filter space at the next sample time based on previous history.

For range, pitch, roll, and yaw, the filter space is four dimensional and difficult to draw. The trajectory of a target through such a filter space now moves in four dimensions, and can be used to intelligently pick what section of filter space to search for future filters.

Figure 20:
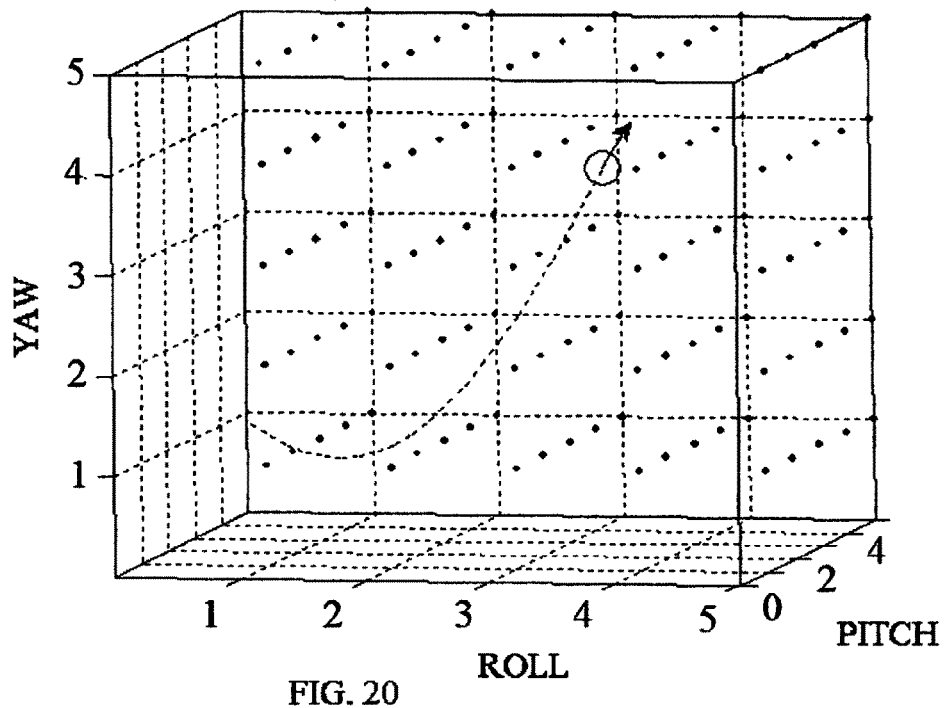
FIG. 20 illustrates a 3-dimensional filter space composed of a plurality of sequential filters, the filter space encompassing yaw, pitch and roll, and a trajectory of filters represented by an arrow through the filter space.

FIG. 20 expands these concepts to the three dimensions, roll, pitch, and yaw. Here, a three dimensional filter space, filter progression trajectory, current target location, and prediction vector is described as is shown in FIG. 18. For each time step, a three dimensional neighborhood around the center filter must be searched for the strongest correlation peak. The term center filter describes the filter closest to the predicted location of the target in filter space. If the target is not found at this point in filter space by a successful correlation, then filters at adjacent points in filter space are then searched next. This concept can easily be expanded to four or more dimensions allowing for 6DOF tracking or more. Possible additional dimensions could be used for multiple targets, lighting conditions, or anything else which might have a strong impact on the frequency content of an image of the target.

Figure 21:
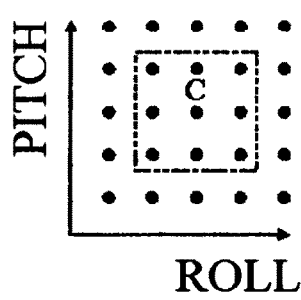
FIGS. 21, 22 and 23 illustrate filter spaces respectively including a bounded condition of a center filter neighborhood, an unbounded condition of a center filter neighborhood and a wraparound condition of a center filter neighborhood.
Figure 22:
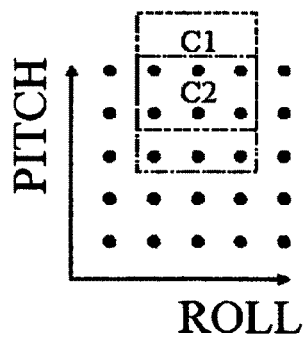
Figure 23:
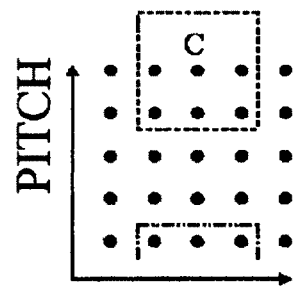

FIGS. 21, 22 and 23 show examples of the center filter and filter search neighborhood, a boundary condition, and a wrap-around condition respectively. This two dimensional case shows a 4×4 filter space for pitch and roll. In FIG. 21, the center filter is marked by a C and the filter search neighborhood is a simple 3×3 area (dashed lines) around the center filter. There are cases, such as FIG. 21, where the filter space will be bounded. If it is known that the target will only be viewed between two hard limits of a dimension, such as an approach docking corridor of a spacecraft or other object, say −10 degrees and +10 degrees pitch, then −10 degrees is a boundary along the pitch dimension in filter space. Because there are no filters for pitch less than −10 degrees, if the center filter C happens to land at −10 degrees, an error would occur. To correct for this condition, a check is added to see if any part of the filter search neighborhood extends beyond the filter space boundary, and if so, the center filter must be moved away from the boundary, essentially offsetting the center filter away from the boundary so that the filter search neighborhood does not extend beyond the boundary, as shown in FIG. 22. This can be done because the predicted best filter will still be contained in the filter search area, just not at its center. When the filters are correlated against the test image, the strongest peak will be recorded and the algorithm will continue as normal.

There are also cases where a wrap-around in filter space can occur, as shown in FIG. 23. If a target is expected to move a full 360 degrees in rotation, filter space will be defined from 0 degrees to 360 degrees along the roll axis. When the center filter lands close to the 0 degree or 360 degree boundary, a wrap-around of the filter search neighborhood must occur. This allows a target to rotate many times and not exceed a filter space boundary. As an example of these concepts, the n-dimensional filter search algorithm was applied to the Hubble automated rendezvous and docking problem using Matlab. The test was performed with a reference video data set (RVDS) and a test video data set (TVDS). Filters were made from the RVDS, which included views of the Hubble Space Telescope from all combinations of range, pitch, roll, and yaw within the boundaries defined in Table 2, which shows five different ranges at which cameras of different field-of-views and focal length are used to image the Hubble. At least one of these cameras, and possibly more, would be mounted to a spacecraft that is to dock automatically with the Hubble Space Telescope.

The Table 1 format shows starting range, range increment and ending range. The same format is used for roll, pitch, and yaw angles.

TABLE 2

| Camera | Range (meters) | Roll (deg) | Pitch (deg) | Yaw (deg) |
| --- | --- | --- | --- | --- |
| Long A | 60:2:130 | −15:5:15 | −15:5:15 | −15:5:15 |
| Long B | 30:1:60 | −15:5:15 | −15:5:15 | −15:5:15 |
| Mid | 10:0.5:30 | −5:5:5 | −5:5:5 | −5:5:5 |
| Short Out | 1.73:0.3:10 | −2:1:2 | −2:1:2 | −2:1:2 |
| Short In | 0.4:0.05:1.73 | −2:1:2 | −2:1:2 | −2:1:2 |

Figure 24:
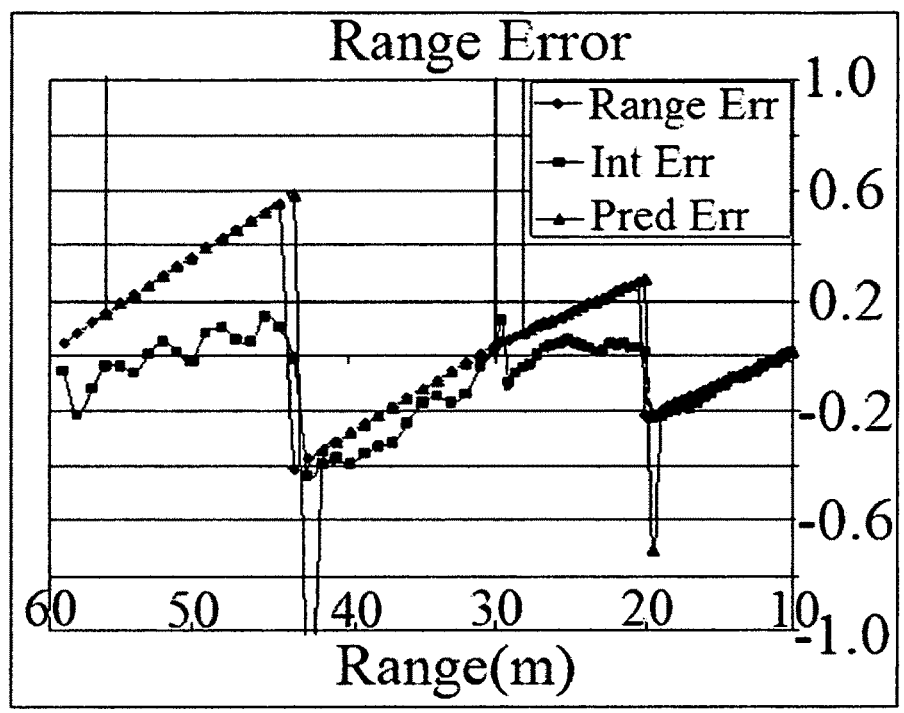
FIGS. 24 and 25 illustrate correlation results of a simulation using predictive selection of filters.
Figure 25:
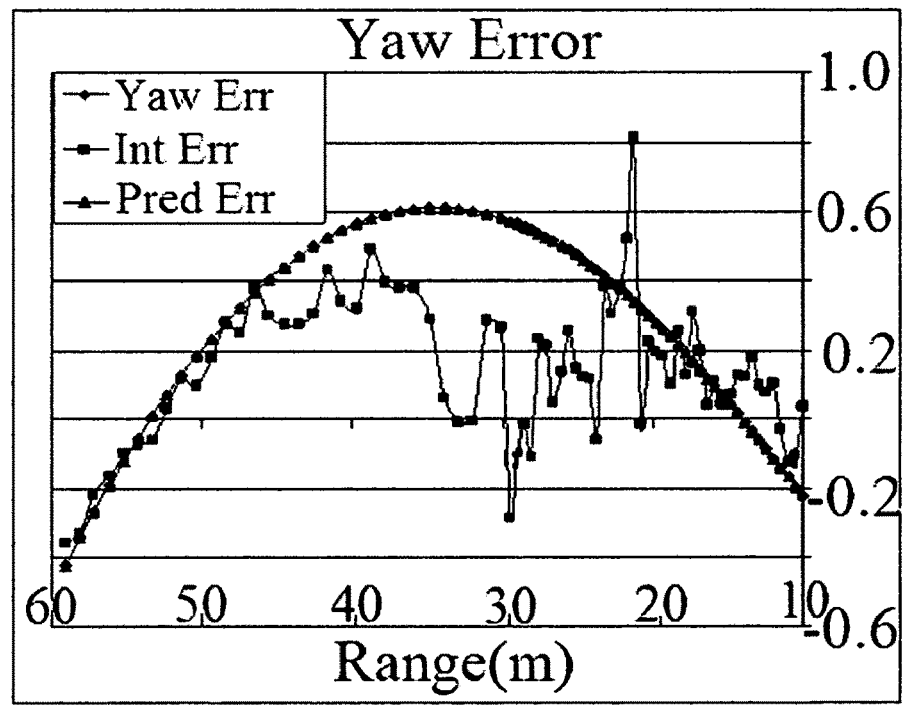

The TVDS included a series of Hubble images at ranges of 130 meters down to 0.5 meters, with small variations in yaw and no variation in pitch and roll. FIGS. 24 and 25 display correlation results of a simulation run while the target was between 60 and 10 meters. This range covers the Long A and Mid range cameras of Table 1. Range error is the actual range of the target minus the range of the "winning" filter. The saw-tooth shape of the range error is due to the filters' incremental spacing in combination with the coarseness of the TVDS. The test frames had approximately the same spacing as the RVDS reference frames. This creates an aliasing affect where the error gradually increases between filters until a midpoint is reached, at which time the error flips from one extreme to the other. For filters spaced in range at every 1 meter, the range error ramps between +0.5 and −0.5 meters. The range prediction error is the difference between the actual range and the predicted range. In this simulation, a running average curve fit was performed on the last seven best filters to predict the next filter. As can be seen in FIGS. 24 and 25, and using this method, the predicted filter very closely matched the actual filter selected except at nonlinear parts of the curve. At these nonlinear parts, the prediction broke down until the curve became more linear. As further experiments were performed, it became clear that the filter prediction would be more accurate if it were based on the interpolated filter history and used much more of the interpolated filter history. Using the interpolated filter data tends to remove affects of nonlinearities from the prediction, and using more history tends to smooth out the predicted filter values.

FIGS. 24 and 25 also show interpolated range and yaw error. The interpolated range and yaw are calculated by identifying the two best filters for a particular test image and interpolating between them based on the intensity of their respective correlation peaks. The main reason to interpolate between two filters with strong peaks is to improve accuracy of range, roll, pitch, and yaw data reported by the correlator algorithm. Without interpolation, the error of each of the target's measured qualities is limited by the incremental spacing of the stored filters. In order to improve accuracy, one would have to increase the number of filters and decrease the filter spacing. This is not believed to be a good option because filter storage space is limited by available memory, and more filters could possibly require more correlations per second by the correlator, increasing computational overhead. Filter interpolation takes advantage of the fact that, as a target gradually approaches the "sweet spot" of a filter, or the place in filter space where the filter has the highest correlation peak, it traces out a correlation surface.

Because filters are generally designed so that their correlation surfaces overlap, a target usually has more than one filter with a strong correlation peak. For example, if a target is at a range of 4.3 meters, and there are filters spaced every 1 meter, the 4 and 5 meter filters will have correlation peaks of significant energy.

A full complex filter designed using 125 images produces a very well-defined correlation peak at the location of a target it was trained to identify. Apparently, there is a tradeoff to be made between number of images per correlation filter, accuracy of and tolerance of the filter to noise, and number of bits per pixel in filter mapping. Applicants have discovered that 4-bit composite filters produce good correlation peaks using 125 images per filter. Using composite filters also reduces the number of correlations per update required to identify range, pitch, roll, and yaw of a target. For single-image filters, the minimum would be the center filter, plus and minus one filter in all four dimensions, and all the filters at the corners of the filter neighborhood. This would total 3×3×3×3=81 filters per update. In order to run at 5 Hz, this would require a correlator to perform 405 correlations per second. If composite filters are used, the required correlations-per-update goes down to 3+3+3+3 or 12 per update. This would require a correlator to perform 60 correlations per second to provide 4 dimensions of updates at 5 Hz. This is a savings of 6.75 to 1.

Coast mode is a mode of operation where a correlator continues tracking a target that becomes obscured for short periods of time and thus produces no correlation peaks for any filter in memory. For a target which is only translating with respect to the camera, obscuration is not a problem. Either the crosshair marking target location is removed until the target reappears, or the crosshair location is updated based upon recent target location history to indicate predicted target location until the target becomes unobscured. For a target which is not only translating, but also is moving in range, roll, pitch, and yaw, i.e. full 6DOF motion, the solution is not as simple. However, using a filter progression trajectory as described above provides a path for a coast mode through n-dimensional filter space.

Imagine a rocket rotating around a single axis. The filter progression trajectory for this target would be a straight line moving along a single dimension of filter space. If the target became obscured, but continued to rotate, it would be a simple matter to extrapolate the predicted location of the target in filter space based on the history of target motion until the target became unobscured. In the algorithm, when the correlation value falls below threshold, the correlator enters coast mode and uses the predicted location in filter space instead of the interpolated value of current correlation peaks. As the length of time in coast mode increases, a measure of uncertainty is introduced. If an obscured target rotates or moves in a way contrary to recent history, there is a strong chance that when the target becomes unobscured, the filter neighborhood currently being searched will not contain the matching filter for the targets current range, roll, pitch, and yaw. If the target is obscured for a small number of frames, a simple coast mode based on the extrapolation from the filter progression trajectory is sufficient to insure reacquiring the target when it becomes visible again. However, for more lengthy periods of obscuration, the uncertainty must be taken into account. This can be done by expanding the filter search neighborhood in a measured way based on length of time in coast mode. If a good correlation peak is not found for a long enough period of time, the filter search neighborhood will eventually expand to encompass the entire filter space. This is essentially a gradual transition from track mode to acquire mode, acquire mode being a condition where no information is known about the current location of a target in filter space, or even if a valid target exists. Thus, when obscuration of the target occurs, which may be caused by the target moving through a deep shadow, the system reverts from a track mode to an acquire mode.

Full Frame and Feature-Based Correlator

Full Frame Correlator

As noted above, using correlators for automated space docking and other applications, it is necessary to determine x, y, range, roll, pitch, and yaw of a target using only imagery obtained from the target by a sensor, which may be one or more video cameras. Where multiple cameras are used, each camera may have has a different field of view and different magnifications in order to accommodate different ranges and angles with respect to a target.

A digital correlator generates a correlation peak when an image of the target, taken by the sensor, matches a previously created correlation filter. The location of this correlation peak gives information about the location of the target in the sensor field of view. The intensity of the correlation peak gives information about the degree of similarity between the imaged target and the filter training image. A correlator easily identifies two degrees of freedom by the x and y location of the correlation peak in the correlation plane. This leaves range, pitch, roll, and yaw, (four dimensions), to accurately track a target in 6DoF. By organizing full-frame filters into a multi-dimensional array, or filter space as described above, wherein each dimension in the array represents roll, pitch, yaw, or range, a target can be tracked in 6DoF. The location of the target in this multi-dimensional filter space indicates which filters are to be correlated against the next frame from the sensor. Interpolation across each of the dimensions can also improve accuracy, also as noted above.

In a break-lock condition, full-frame correlation instantly re-acquires the target as soon as the conditions which caused the break-lock, such as an obscured target, are removed. Full-frame correlation can also determine target 6DoF information from a single good correlation. The drawback of using strictly full-frame correlation is the massive number of filters required. Also, the only way to increase accuracy of 6DoF information using this technique is to create filters at finer and finer increments of range, roll, pitch, and yaw. As filters are made at successively closer intervals, another limitation arises. Correlation peak intensity becomes susceptible to noise from many sources, such as lighting, shadows, and how close the target imagery matches training imagery. The correlation peak intensity also falls off in a nonlinear fashion when dealing with more than a single dimension in filter space. As a result of these problems, a real-time system integrating full frame correlation and feature-based correlation is optimal.

Feature-Based Correlation Algorithm

It should be apparent that correlations of the present invention can only be made when one or more targets can be visualized. Prior to the target becoming sufficiently visible for docking or other maneuvers, other sensors, such as radar, laser range finders, GPS systems and the like may be used to track position and range to the target/targets.

A filter made using only a subset of the target, or a unique feature of the target, will track the location of that unique feature in the camera's field of view. Multiple filters, each made from separate unique features of the target, track the location of those unique features in relation to each other. Intelligently selected unique features makes it possible to calculate full 6DoF information based on the correlation peak locations of such generated filters. An example of how to select these features will be discussed hereinafter.

Some advantages of feature-based correlation are as follows. Feature-based correlation relies on multiple correlation peak locations, and not correlation peak intensity to derive 6DoF information. Correlation peak location is inherently insensitive to a variety of noise sources such as lighting and shadows. Also, feature-based correlation does not derive its accuracy from the number of filters applied to the problem, but rather from the field of view and resolution of the sensor chosen, coupled with the ability to interpolate between sensor pixels. Hence, feature-based correlation can produce more accuracy, using fewer filters, as long as a sensor of sufficient number of pixels is chosen. However, feature-based correlation does have some problems when used by itself. Particularly, in order to obtain the highest accuracy from the algorithm, feature filters must be made from a small region of pixels directly around the desired feature. With fewer pixels on target, a feature filter does not have the same signal to noise ratio as a filter generated from an entire target. For a feature filter, the portion of the target not used to generate the filter effectively becomes a source of noise.

Combining full-frame and feature-based correlation algorithms yields a new algorithm combining advantages of each. Three different modes of operation track the target depending on how much information is currently known about the targets 6DoF pose. Full-frame acquire mode attempts to locate the target given zero information. Full-frame track mode is a transition mode to locate features on the target in preparation for the next mode after the range-gate has been determined. Feature-based track mode produces 6DoF pose information of the target using feature-based windowed filters.

Figure 26:
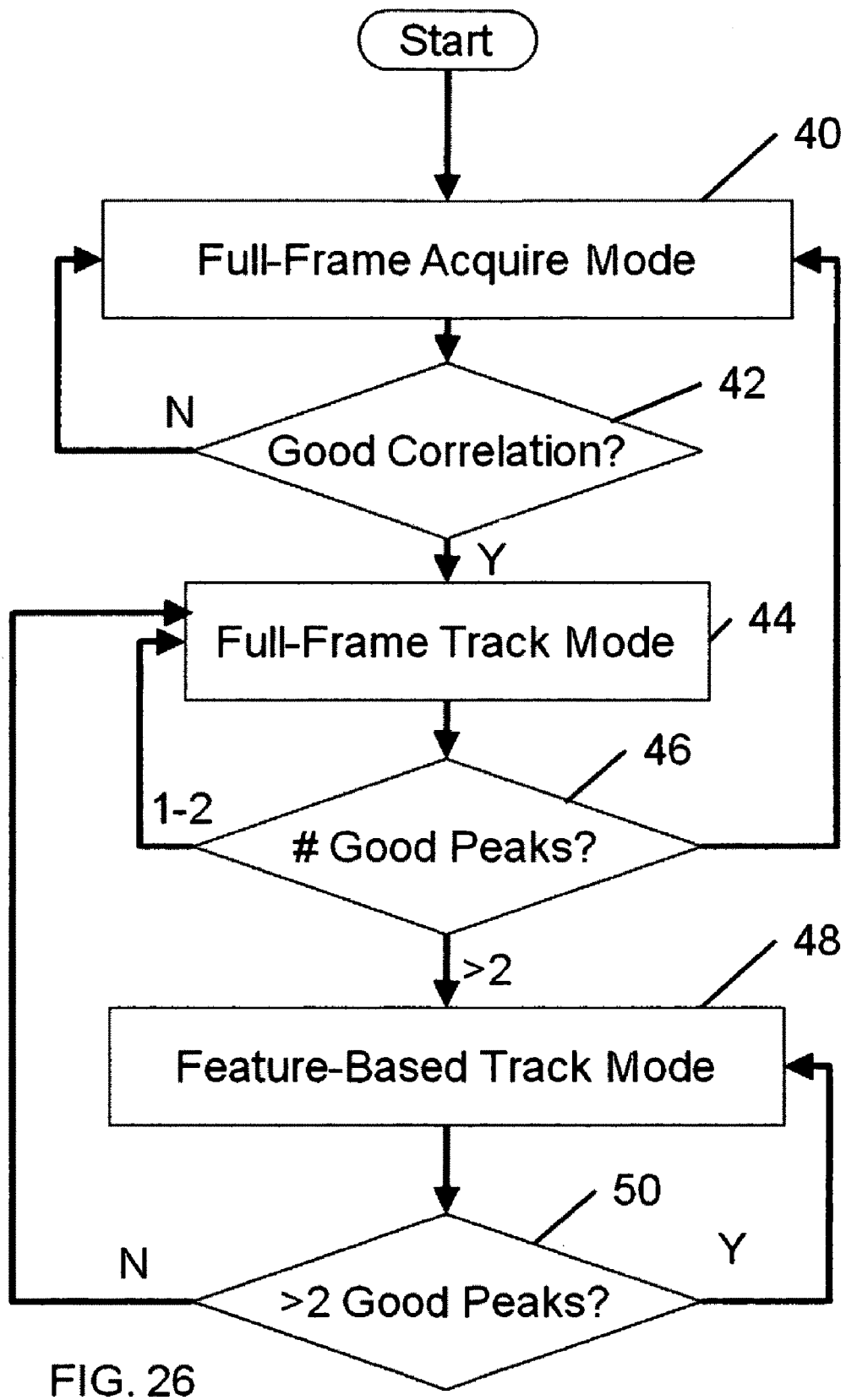
FIG. 26 is a flowchart illustrating logic flow from an acquisition to a track mode.

FIG. 26 flowcharts these three modes. At box 40, full-frame acquire mode is used when there is no current knowledge of the target's position or pose. When a target is within visual range, full-frame composite filters that are insensitive to roll, pitch and yaw created at different ranges, or range-gates, are correlated against the current sensor image in order to find any good correlation peaks. If a sensor image generates a strong correlation peak on a particular full-frame filter, as shown at box 42, then the target has been found at a particular range, X, and Y location. If a good correlation is not found, as defined by a correlation which exceeds a predefined correlation metric, such as peak-to-secondary-peak ratio, then the algorithm loops back to box 40 and another full frame filter at the next range gate is tried.

When a good correlation is found, the range-gate where the peak was found allows a transition to full-frame track mode, as shown at box 44. In other instantiations of the invention, a range finder, such as a laser or radar range finder, may provide range information so that initial range filters may be predictively selected. Full-frame track mode determines necessary information to transition from full-frame acquire mode to feature-based track mode. Range-gate information of the target is used to load the correct feature filters of the target at a particular range. These full frame feature filters, after correlation, indicate location in the sensor FOV of all features required to determine 6DoF information of the target. At box 46 a test is made to determine if less than two features are detected, and if so, then the program loops back to box 44, where the full frame track mode performs more correlations. Once more than two target features are located, the algorithm falls through to box 48, where the program transitions to feature based track mode. Feature-based track mode uses 256×256 pixel windows from the full 1024×1024 sensor array to "zoom in" on individual target features. Features in this mode are thus effectively correlated at a higher resolution than the full-frame modes, therefore, peak locations and the resulting 6DoF pose information are more accurate. This mode is the optimal mode for target tracking because of higher accuracy. If the number of good correlation peaks drops below three, as where a target feature passes through a shadow, the program loops back to full frame track mode, or in some instances full-frame acquire mode. This loopback allows the full frame track mode to re-acquire the target.

Figure 27:
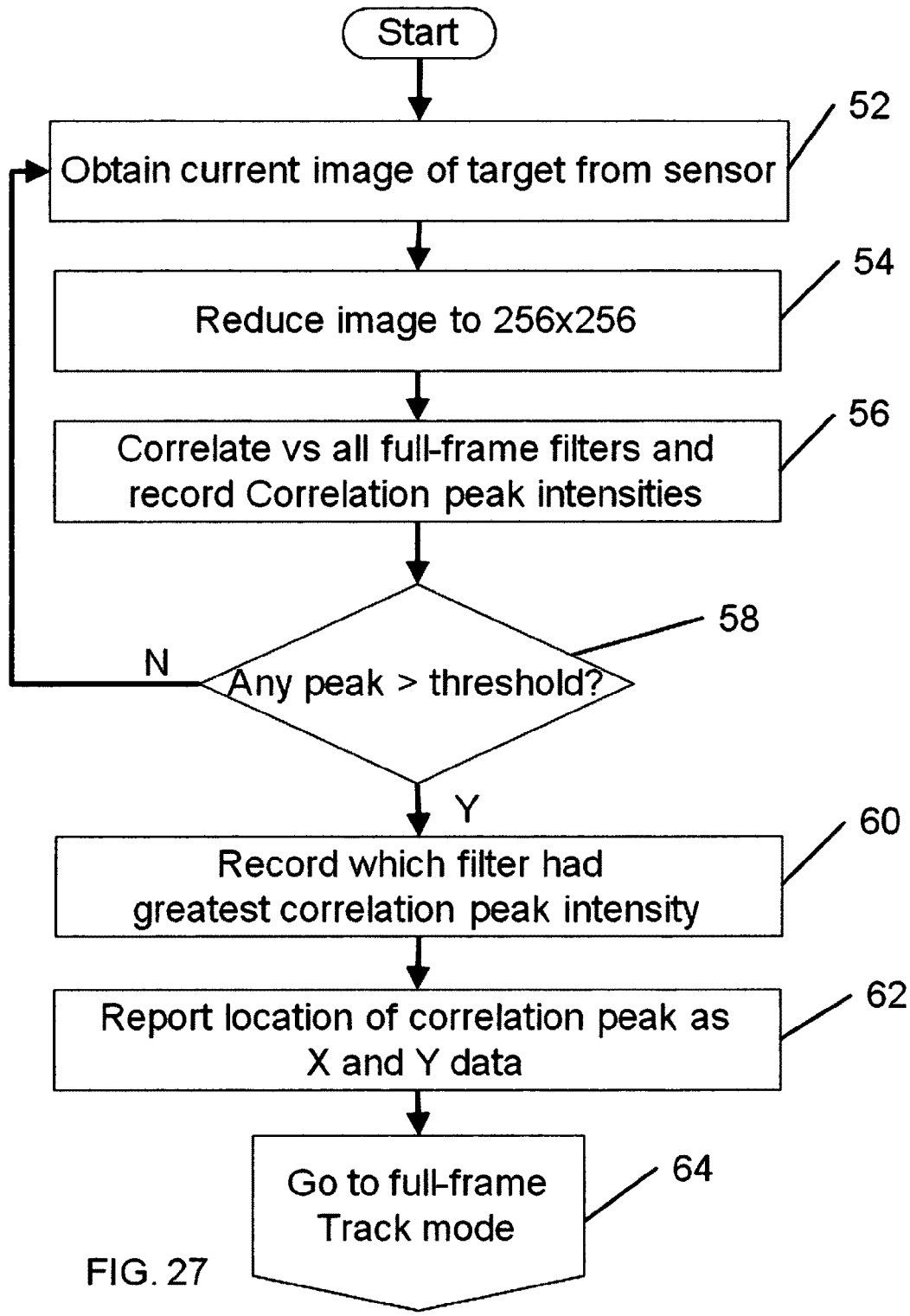
FIG. 27 is a flowchart of an acquire mode of operation.

Full-frame acquire mode attempts to acquire a target given no prior information on the target's position or pose. FIG. 27 flowcharts this mode in detail. To operate in full-frame mode, and at box 52, an image must be acquired from the sensor, and then reduced at box 54 from a 1024×1024 to 256×256 pixel format due to hardware limitations. In other systems, a larger pixel image than 256×256 may be used. There are two current methods to achieve this reduction: sampling and averaging. Sampling simply creates a new image by taking 1 pixel from every 4×4 pixel square from the 1024×1024 sensor image. Sampling only uses a single pixel out of every block of 16 pixels contained in the original sensor image. Averaging takes every 4×4 pixel area and averages the pixel values to create a single pixel in the new 256×256 image. Sampling requires less processing time at the risk of completely missing very small features. Averaging retains all original features, but does so by blurring the original image. Obviously, if the sensor image is a different format from 1024×1024 then sampling and averaging would be implemented appropriately.

Correlation begins at box 56 once a 256×256 full-frame image is created. Acquiring the target includes discovering which full-frame filter generates a strong correlation peak. In the acquire mode described above, composite filters at different range-gates are correlated against the incoming image until a correlation peak is found that exceeds a predetermined amount, as tested at box 58. This correlation metric could be peak-to-secondary-peak ratio. Peak-to-secondary-peak ratio simply takes the highest intensity point in the correlation plane, the correlation peak, and divides it by the next highest intensity point in the correlation plane more than 5 pixels away from the correlation peak. A typical good peak-to-secondary-peak ratio is 1.6. A peak which exceeds the correlation metric by the predetermined value can also be described as exceeding a threshold.

If a correlation peak is not found, or does not exceed the threshold, the program loops back to box 52, where a new image is obtained and the program again falls through to box 58. Where a correlation peak exceeds the threshold at box 58, control is passed to box 60, the intent of full frame acquire mode as explained with respect to FIG. 25 is to identify which filter correlates with the current image obtained in box 52. Box 60 records this information to be passed onto full-frame track mode. Box 62 records the location of the correlation peak as input information into full-frame track mode. Box 64 transitions the system, with the recorded information of Box 62 and 64 to full-frame track mode.

Filters generate a correlation peak for a target that varies in range by as much as ten percent from the nominal range of that filter. This allows filters to be created at increments of range from acquire to docking of the target. Each of these range regions is a range-gate. Once the correct range-gate is determined, this information can be stored and used in full-frame track mode. In addition, once a good correlation peak is found, or one that exceeds a predefined value of the correlation metric threshold, the X and Y location of this peak can be reported as bearing information of the target. It is possible to give bearing and range based on a single good correlation peak in full-frame acquire mode. The range-gate filter arrangement is possible because in a typical AR&D scenario, the nominal approach trajectory is known to within a few degrees of pitch, yaw, and roll of the target. A single filter generated at the correct range can easily correlate on a target that is off in one of these dimensions by a few degrees. This can be thought of as a four dimensional filter space similar to that as discussed above. For this general case, the 6DoF results from the current frame would be used to update filters not only on changes in range, but also on changes in pitch, yaw, and roll.

Figure 28:
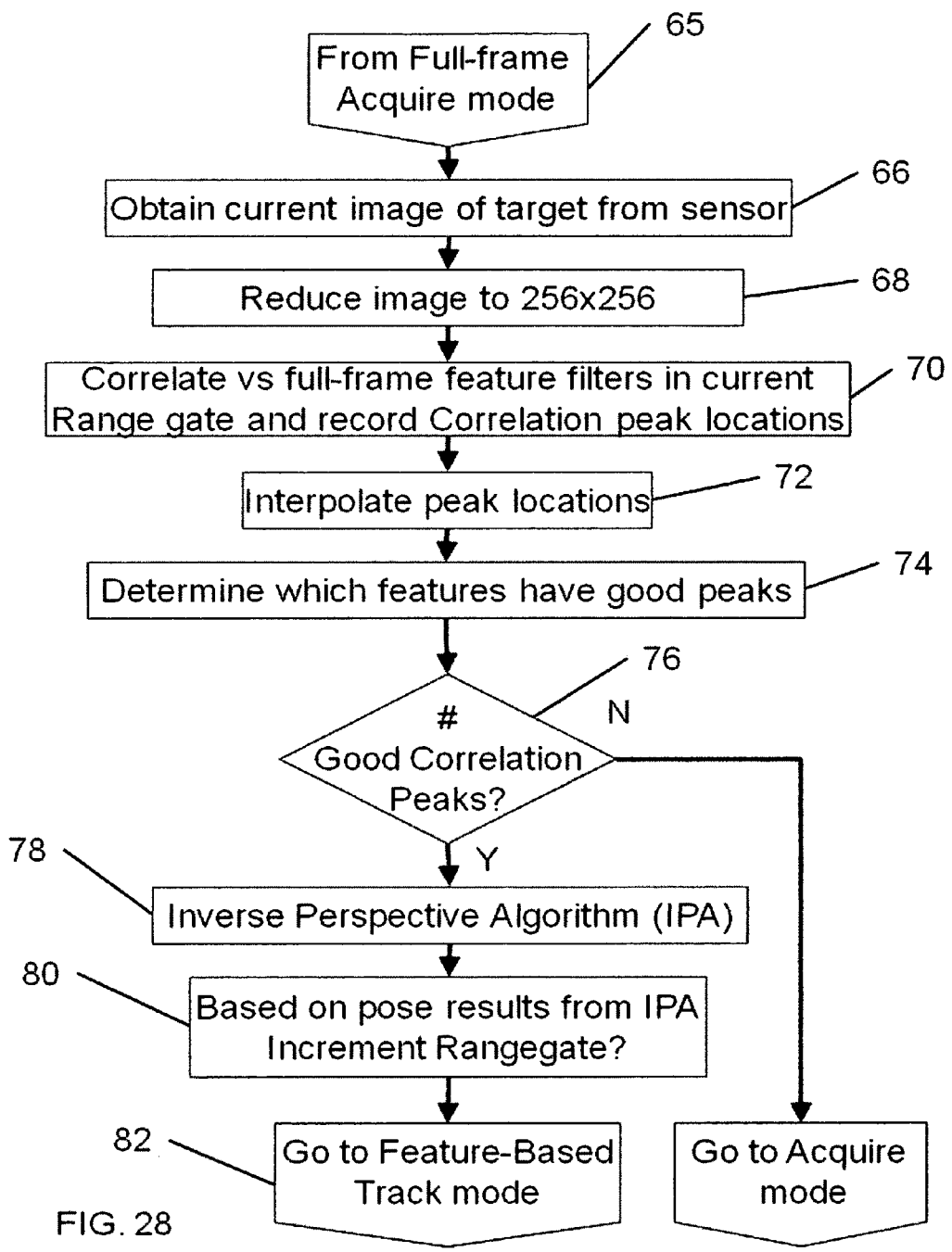
FIG. 28 is a flowchart of a feature-based mode of operation.

Full-frame track mode (box 64 of FIG. 27 and box 65 of FIG. 28) determines necessary information to transition from full-frame acquire mode to feature-based track mode. FIG. 28 flowcharts this mode. Imagery is obtained from the Sensor at box 66 and either sampled or averaged to the correct format, such as the 256×256 pixel format at box 68 as was done in full-frame acquire mode. Range-gate information of the target is used to load the correct feature filters of the target at a particular range, and at box 70. Multiple filters, each designed to locate a particular target feature are correlated against the same image in order to identify the location of multiple target features using full frame mode.

Box 72 takes a 5×5 pixel region centered on each correlation peak location and finds a simple centroid of pixel intensity. Because of the nature of correlation peaks, the centroid of the correlation peak is used to identify the true location of the target aimpoint to sub-pixel accuracy. A simple example of this is when the true target aimpoint lies on the boundary between two pixels in the imager. These two pixels will have the same intensity, and so a centroid of the two pixels will reveal the true target aimpoint as being on the pixel boundary between them. The output of Box 72 provides an estimate of this sub-pixel target aimpoint location for each of the feature filters. Box 74 uses a correlation metric such as peak-to-secondary-peak ratio, to determine which of the feature filters are currently producing good correlation peaks. Box 74 evaluates the peak metric for each correlation peak and passes this information to Box 76. Box 76 decides if there is enough information to pass to the Inverse Perspective Algorithm (IPA) and calculate the distance, bearing, roll, pitch, and yaw of the target. The IPA requires X and Y location information of at least 3 features to produce a good output. Therefore, Box 76 evaluates if 3 or more feature filter correlation peaks exceed the correlation metric threshold by the required amount to be considered good. If so, it passes the X and Y peak location information of all good correlation peaks to Box 78. If only 1 or 2 correlation peaks are good, then the algorithm returns to Box 66 to process the next frame. If no correlation peaks are good, then the algorithm transitions back to full frame acquire mode to attempt to re-acquire the target. In full-frame track and feature-based track modes, feature location information from the sensor image plane is flowed to an Inverse Perspective Algorithm (IPA) at box 78.

The IPA takes 2D feature location information and iteratively matches it to a previously generated 3D feature model of the target to find an optimal mapping between 2D and 3D space. The results of the iterative solution yields 6DoF information between the sensor and the target. Because of how the IPA works, it is desirable to have at least three, and preferably as many as nine features of the target on which to track. The optimal number of features is dependant on processing power of the hardware, and uniqueness of the features' target position. It is possible to track more features, but there is diminishing benefit from additional filters. Each additional filter does add accuracy and robustness to the algorithm, at the cost of additional processing time in the hardware.

These full-frame feature filters, after correlation, indicate the location in the sensor FOV of all features required to determine 6DoF information of the target. The use of interpolation in Box 72, as discussed above, of pixel data further improves feature location accuracy in the correlation plane. Interpolating over a correlation peak to improve the accuracy of the detected peak location dramatically improves performance. Interpolation has been shown to improve peak location information by from 2 to 10 times, giving sub-pixel accuracies.

An important part of the algorithm involves determining which features have sufficiently large correlation peaks as in Box 74 to use for the determination of 6DoF information with the IPA. Currently, a simple correlation peak threshold divides good correlations from bad correlations. This dramatically improves the robustness of the algorithm by ignoring features that do not properly correlate with their corresponding full-frame feature filter. The feature may have become obscured by another object, the feature may be altered by deep shadows or bright glints and reflections, or a portion of the target may have changed since training imagery was obtained. If for any reason a feature does not match its corresponding filter, and does not produce a good correlation peak, it is ignored by the algorithm in favor of features that do produce good peaks. This culling of bad peaks keeps erroneous feature location from being input into the IPA, which would cause it to have greatly diminished accuracy. Another correlation metric which can be used is peak-to-secondary-peak ratio.

Once the list of good correlation peaks is determined in Box 74, all the information required for the IPA at box 78 is available. The IPA takes the 2D location of three or more features in the image plane, along with a previously generated matrix containing x, y, and z locations of each feature relative to a target origin and produces 6DoF information of the target relative to the camera reference frame. The IPA also generates a rotation and translation matrix that can be used to calculate where all features that did not produce good correlation peaks with the current image should be located in the image plane. This information will be used in the feature-based track mode.

The last operation, box 80, in full-frame track mode is to compare the range information calculated by the IPA to the list of range-gates and determine if new feature filters need to be loaded based on the range of the target. In full-frame track mode, it is possible to generate 6DoF pose information of the target. However, this mode does not give as accurate results as feature-based track mode. Once more than two target features are located with good correlation peaks, the algorithm can transition to feature-based track mode.

Box 82 transitions the system to feature based track mode. The current range gate that was found to have three or more good correlation peaks of target features, as well as information about what features generated correlation peaks, and where they were located is saved for use in the feature based track mode.

Feature-based track mode is optimal for target tracking because of its higher accuracy. FIG. 27 describes this mode in detail. The process uses 256×256 pixel windows from the full 1024×1024 sensor array to "zoom in" on individual target features. Features in this mode are effectively correlated at a higher resolution than the full-frame modes, therefore, peak locations and the resulting 6DoF pose information is more accurate. The 256×256 pixel windows corresponding to each feature are correlated against the correct feature filter and the correlation peak location recorded. This method produces accuracy of up to four times better in X and Y than full-frame mode. This improved accuracy flows down to improved 6DoF information from the IPA. After the windows for each feature have been created and correlated against the proper feature filters, this mode is very similar in operation to the full-frame track mode, except with better knowledge of peak locations. Interpolation, good peak determination, and IPA are all identical to the full-frame mode in operation.

Figure 29:
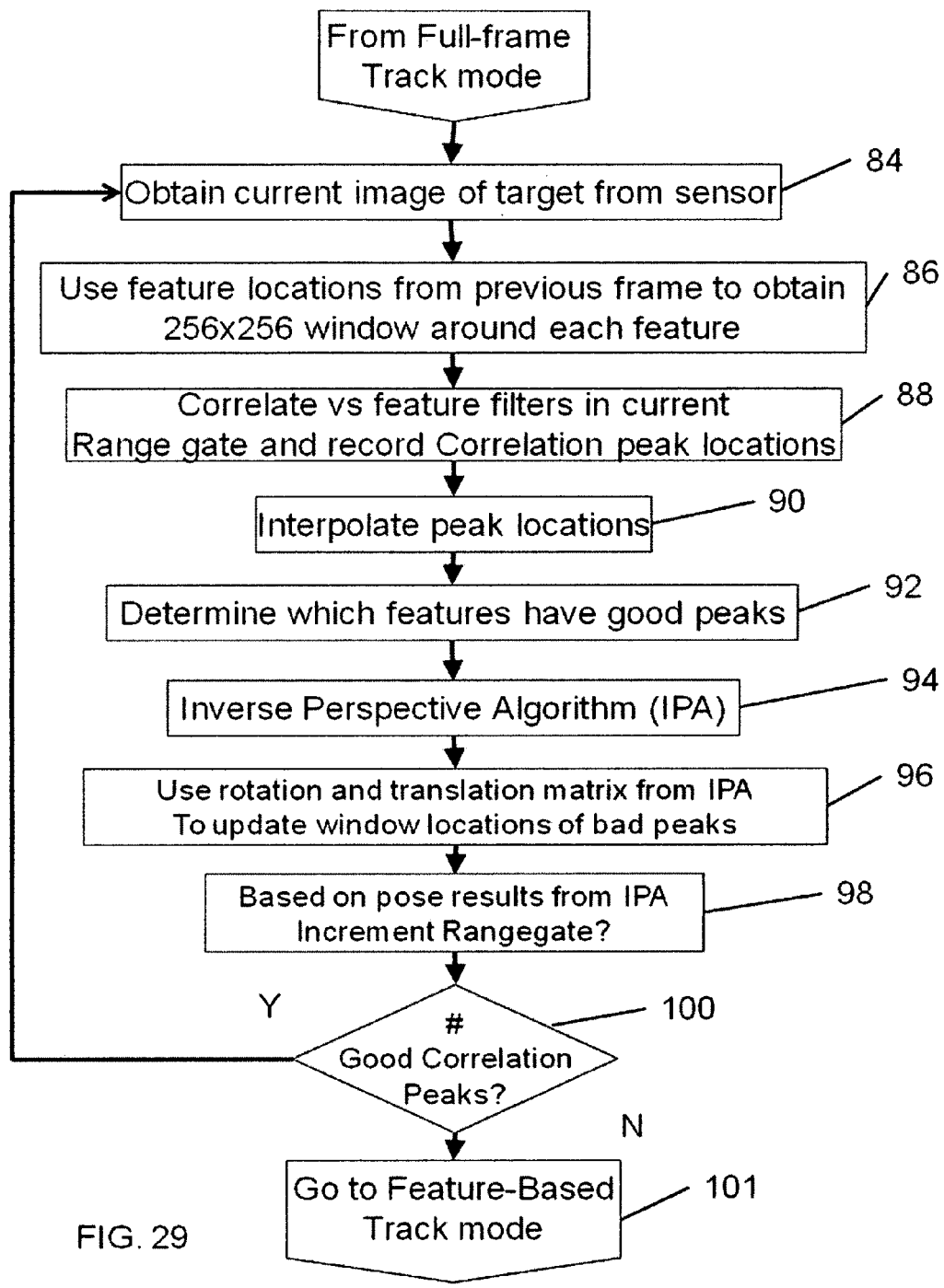
FIG. 29 is a flowchart of the feature-based track mode of operation.

In Box 84 (FIG. 29), the image is obtained from the sensor and stored for further processing. In Box 86, the location of all features from the previous frame is used to create 256×256 pixel sub-windows around each feature. Each of these windows contains only 256×256 pixels and has its respective feature centered in the window. In Box 88, the correlation engine is provided with each of these windows along with the corresponding feature filter of the appropriate range gate. The resulting correlation peak location is recorded for use by the algorithm. In Box 90, each correlation peak from each feature correlation is interpolated using a simple centroid algorithm to obtain the peak location with sub-pixel accuracy. This sub-pixel feature location information is recorded for use by the algorithm. In Box 92, each feature correlation peak is evaluated using a correlation metric, such as peak-to-secondary-peak ratio. Those features with correlations exceeding a predefined correlation metric value are considered "good" and are passed along with their location to the IPA. In Block 94, the IPA calculates the target range, bearing, roll, pitch, and yaw based on the feature locations with good correlation peaks. In Box 96, each feature window location is updated with the latest good correlation peak location information so the feature remains centered in the window. For the features that did not have good correlation peaks, the rotation and translation matrix from the IPA results, are used to update the window locations to be centered on where these features should be. In Box 98, the range from the IPA is compared to the current range gate to determine if the range gate needs to be incremented to the next gate. Verifying that the range gate is correct always ensures that the correct filters, designed to correlate with features for a specific range, is used. In Box 100 a decision is made. If there are greater than 2 good feature correlation peaks, feature track mode outputs a pose for the current image frame and then continues to process the next frame. If there are 2 or fewer good feature correlation peaks, the algorithm transitions to Box 101, full-frame track mode.

One difference between the full-frame and feature-based track modes is the use of IPA output information. In feature-based track mode, it is critical to correctly update the location of the 256×256 pixel windows from frame to frame. If, for some reason a feature stops correlating, then it is not possible to use this correlation to predict where the feature will be in the next frame. If needed, full-frame track mode can be used to re-acquire features and pass window location information to the feature-based track mode. Once a feature has completely moved out of a window, there is no longer any chance of getting a correlation peak, because the feature will no longer be seen in the window. To prevent this from happening, the rotation and translation matrices output from the IPA routine are used, in Box 96, to back calculate estimated feature locations for all features that did not correlate in the current image. This estimate ensures that windows are correctly located in the next image, and that it is still possible to obtain a correlation between filter and feature.

The last operation in feature-based track mode, in Box 98, is to compare the range information calculated by the IPA to the list of range gates and determine if new feature filters need to be loaded based on the range of the target. If the number of good correlation peaks drops below three, the algorithm must transition to full frame track mode or full frame acquire mode to attempt re-acquisition of the target.

Figure 30:
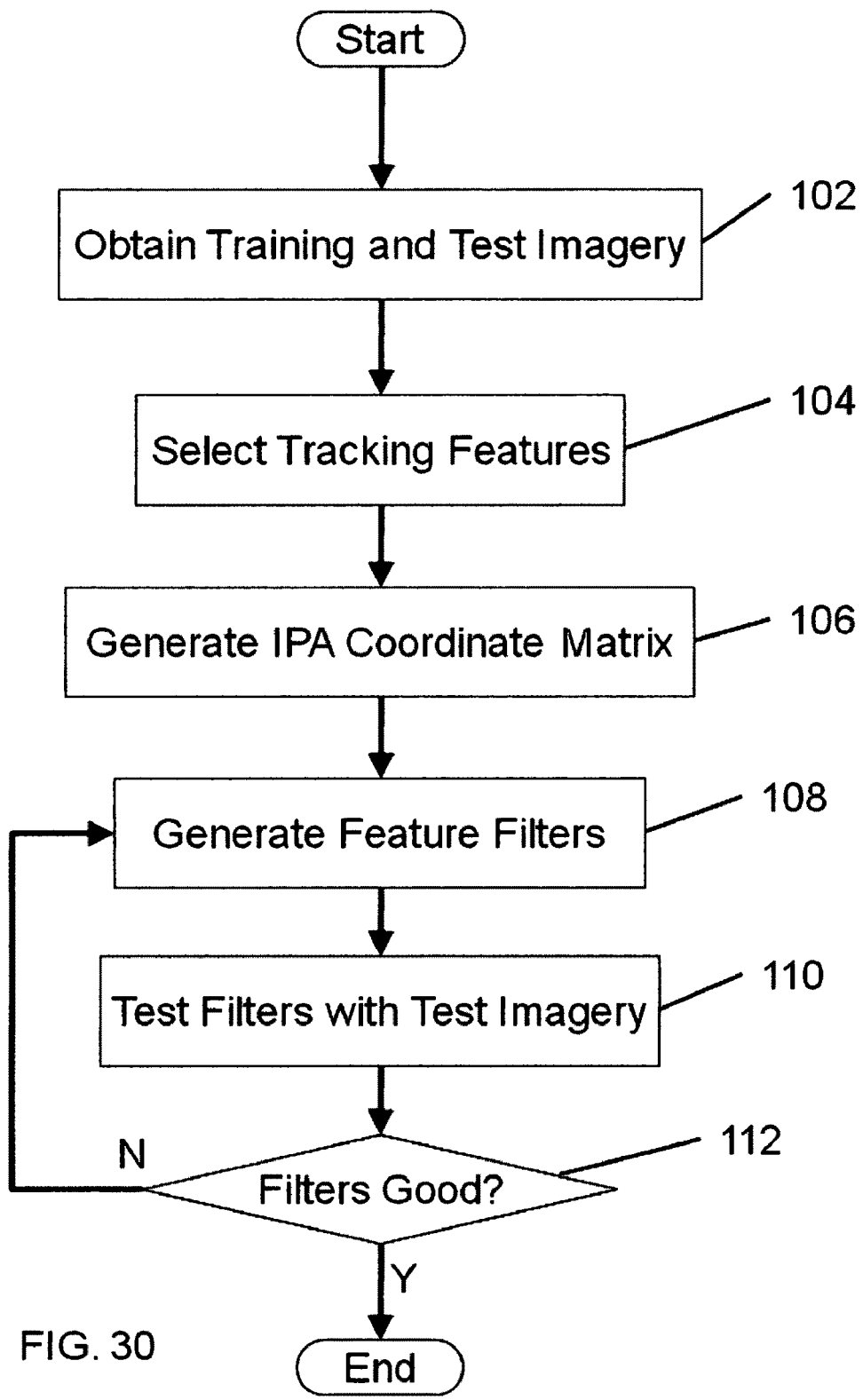
FIG. 30 is a flowchart illustrating creation of training of filters of the instant invention.

For proper operation of the full-frame and feature-based correlation algorithm, the system must be properly trained by constructing filters from training imagery. FIG. 30 flowcharts such training imagery. It is required to have imagery of the target, as shown in Box 102, that covers all combinations of range, pitch, roll, and yaw within a few degrees and about five percent range. This guarantees that it is possible to make a filter that will produce a good correlation peak of the target at any possible range, bearing, roll, pitch and yaw. This imagery can be either actual sensor imagery of the target, or simulated imagery as long as the simulated imagery produces good and robust correlation peaks between filter and the real target over the full approach trajectory. Simulation imagery must have good geometry, lighting, and correct textures at a high enough resolution to correctly correlate with the target. As in Box 104, once this imagery is available, features must be selected from which to make filters. It is necessary to have at least three, and preferably 5 to 9 features in the field of view of the sensor at all points along the approach trajectory. Features must be selected that are distinguishable by the correlator from each other and from any background noise. They should also have high contrast, high signal to noise ratio with respect to the rest of the target, and symmetry for improved performance.

It is desirable to select features that have symmetry with respect to changes in pitch, yaw, and roll. Symmetry allows for improved filter performance at varying rotations. It is also desirable for features to be spread out around the FOV as much as possible to improve the accuracy of the IPA. Here, features that are far apart have higher accuracy due to trigonometric calculations. It is necessary to have at least one feature, and preferably more than one, which is "out of plane" of the target as discussed above with respect to FIGS. 4, 5. For example, and as described, if the target is a flat surface, some form of post rising above the plane of the disk would be necessary for proper operation of the IPA. The greater the distance in Z this out-of-plane feature has, the higher the accuracy can be expected for pitch and yaw measurements. Features that are as deep in the z dimension as the target is wide would yield the most accuracy.

In Box 106, an IPA coordinate matrix is generated of the target. This matrix describes the location of every feature in X, Y, and Z. This matrix is required by the IPA algorithm to correctly output range, bearing, roll, pitch, and yaw, given 2D feature locations.

In Box 108, once features are selected for filter making, it is necessary to make both full-frame and windowed feature filters. For efficiency, this can be done in parallel, using the same code to do both. The user must, for all range gates, and all features, select aimpoints around which feature filters can be made. These aimpoints are where the correlation peaks will occur in the correlation plane for a feature. These aimpoints should correspond, as accurately as possible, to the x, y, and z information contained in the coordinate matrix that describes the target in reference to an origin. Any error introduced in aimpoint selection will create corresponding error in x and y feature location that will introduce error into the range, bearing, roll, pitch, and yaw information generated by the algorithm.

If the training imagery is generated from a computer model, it is possible to completely automate the filter making process. The computer model can be marked with separate markers for each feature on a different layer of the model. The markers must be uniquely identifiable by something such as gray levels. When the simulated training imagery is rendered from the computer model, each rendered image has a second layer with feature marker location information. These markers can be used by an automated filter making routine to identify the feature aimpoints automatically. This method has many advantages over hand picking feature aimpoints. Aimpoint selection by hand is both laborious and inaccurate. An automated routine operates both faster and with higher accuracy. The higher accuracy of feature aimpoint selection when filters are generated translates to higher accuracy of the resulting range, bearing, roll, pitch, and yaw information when the filters are tracking the target. Once features and their aimpoints are selected, it is possible to create a corresponding target coordinate matrix that will be required for the IPA. The IPA coordinate matrix contains x, y, and z locations of each target feature relative to an origin.

This algorithm can use either single frame or composite filters. There is a tradeoff between the aimpoint accuracy of single frame filters, and the robustness to variations in pitch, yaw, roll, and range of composite filters. Once a set of full-frame and windowed filters are created, they must be tested against a set of test imagery to determine their performance. Test imagery allows for algorithm parameters such as thresholds and range gates to be set for robust performance. In Box 110, the generated filters are tested against test imagery. Test imagery is purposefully different from training imagery to prevent autocorrelation. The test imagery only has to be slightly different from the training imagery, and must have truth data associated with it such that the algorithm can be tested for accuracy. In Box 112, if the feature filters successfully track each filter then the process is complete. If a filter is found that produces bad results, then the process returns to Box 108 to create a better filter for that feature and range gate.

Figure 31:
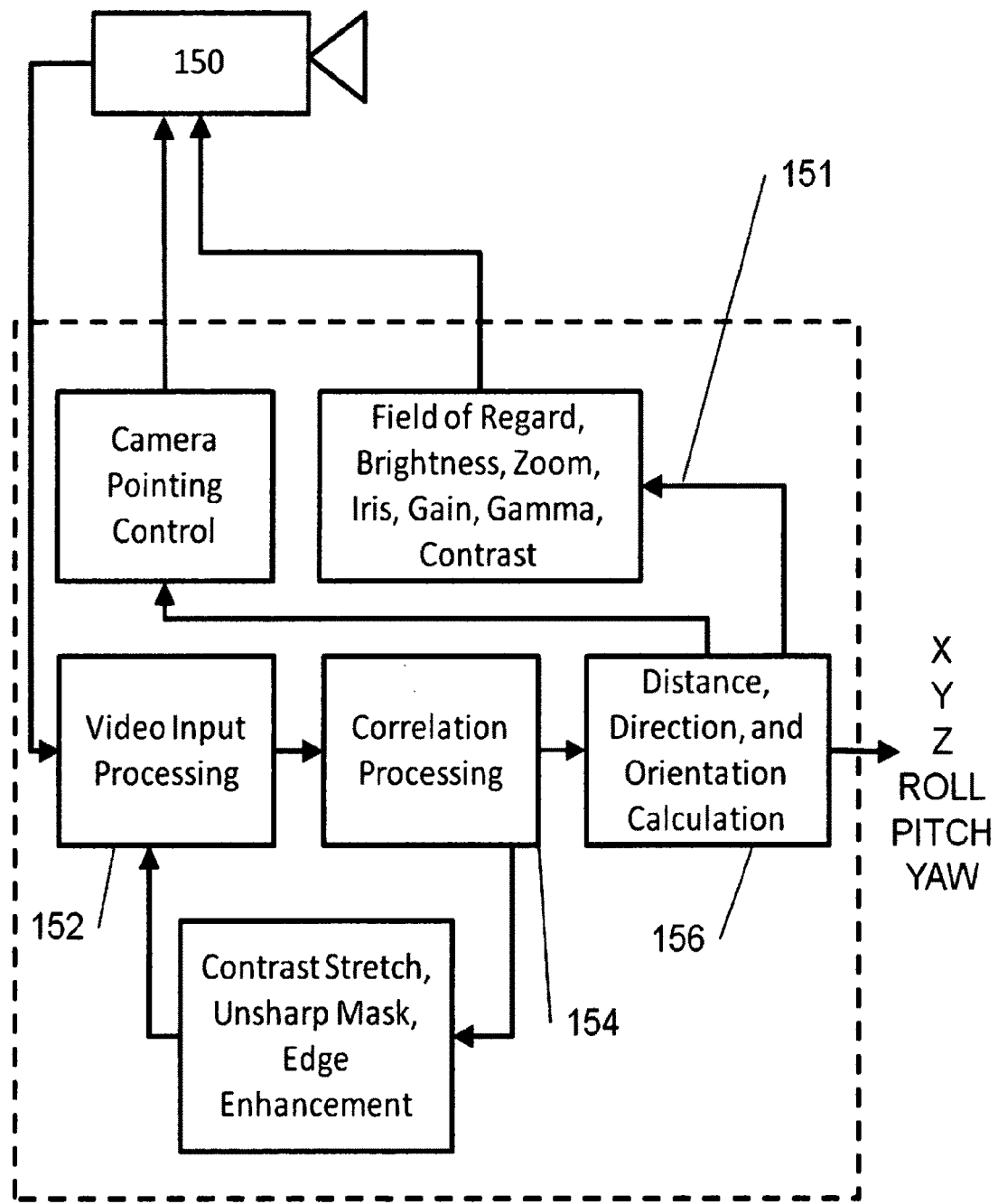
FIG. 31 is a block diagram of the correlation system showing various feedback loops.

Unique to the instant invention are several feedback loops that provides optimized performance. Representative feedback loops that may be implemented in any or all embodiments of the instant invention are illustrated in FIG. 31. Here, the correlator system of the instant invention is shown generically in block diagram form, although it is to be understood that Applicants correlator system may be programmed into a variety of computing systems. While a general purpose computer may be used, and even with a real time operating system, such a general purpose computer is not applicable to spacecraft as it would be too slow and not radiation hardened. As such, and for spacecraft applications, Applicants implement their correlator into a single FPGA (field programmable gate array), as indicated in their paper entitled "A POSE AND POSITION MEASUREMENT SYSTEM FOR THE HUBBLE SPACE TELESCOPE SERVICING MISSION", by Michael Balch and Dave Tandy, *Society of Photo-Optical Instrumentation Engineers*, Vol. 6555, May 3, 2007, which paper incorporated herein in its entirety by reference. Sensor 150, which as noted above may be a video camera, an infrared camera, laser radar, synthetic aperture radar, a hyperspectral sensor or any other sensor that creates a 2 or 3 dimensional representation of a target. Sensor 150 provides as an output an image or representation of its field of view in digital format that may be 16, 32 or 64 bits per pixel. Also as noted above, the pixel array may be an array of 1024×1024 pixels. This output is provided to a video input processing unit 152, which reduces the image to a 256×256 format for reasons that will be explained, and applies algorithms that enhance correlation performance. Examples of such algorithms are a contrast stretch, an unsharp mask and edge detection algorithms, which algorithms being in many commercial programs, such as Adobe Photoshop™. The enhanced image from processing unit 152 is provided to a digital correlation processor 154, where digital correlations are performed between the enhanced image and composite filters designed and arranged in a filter space as described above. Significantly, when a correlation is found, feedback from correlation processing unit 154 may be provided back to video input processor 152 that adjusts parameters of the various enhancement algorithms in order to maximize the correlation peak. In other instances, such is when the system is attempting to acquire a target, parameters of brightness, contrast, gain and gamma may be varied by video input processing unit 152 in order to match current lighting conditions of the target generally with lighting conditions used to create the filters of the target. In other instances, such as during a tracking mode, these same parameters may be varied by distance and direction calculator 156 in order to maximize correlation peaks. Other parameters that may be varied by calculation unit 156 are field of regard and an iris setting of sensor 150.

The output of calculation unit 156 is pose (yaw, pitch and roll parameters of the target), a trajectory of the target, range and bearing, or 6 degree of freedom (6DoF) information.

Figure 32:
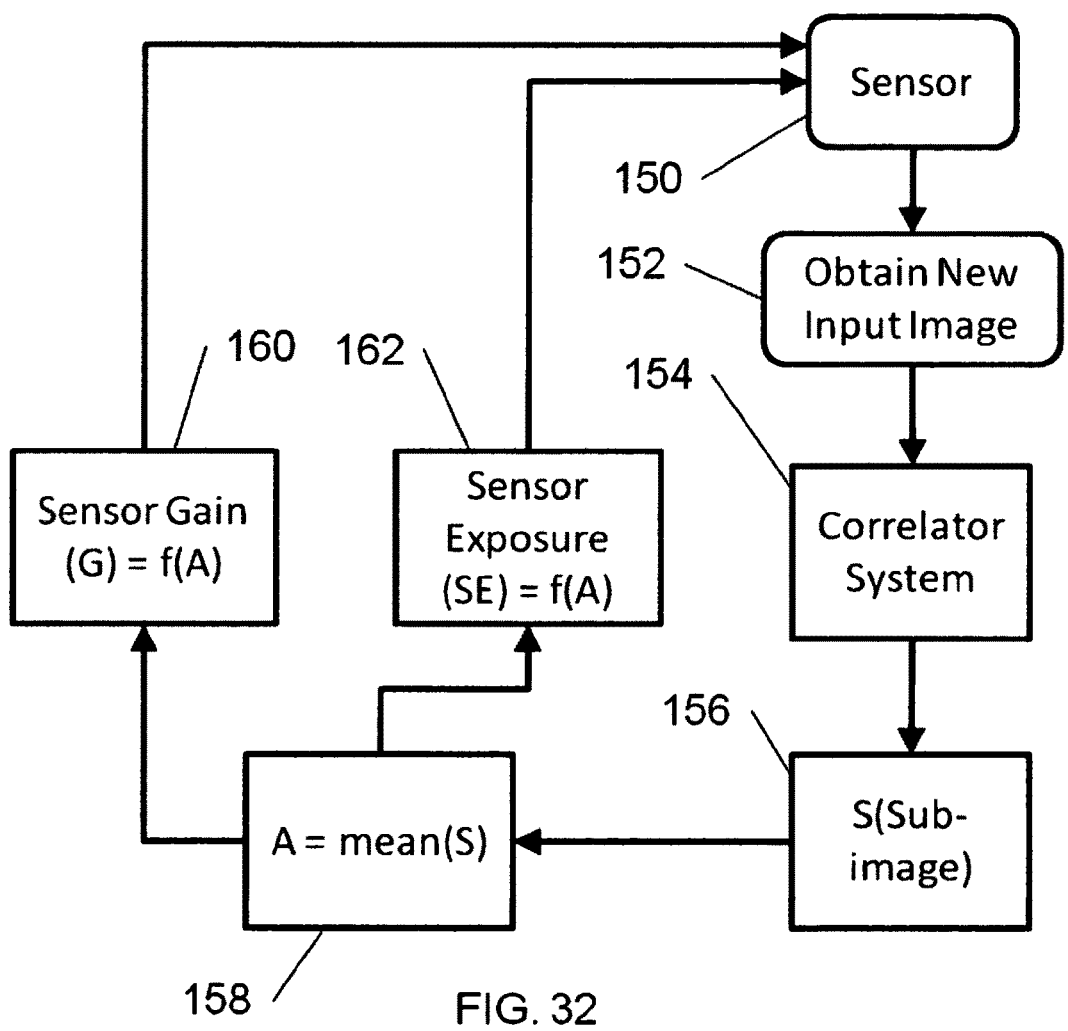
FIG. 32 is a block diagram of a sensor loop of the present invention.

FIG. 32 shows an implementation of a feedback loop that may be used to control gain and exposure settings of the sensor based on the average pixel value in an area of interest around the correlated aimpoint of the target. This is accomplished by initially obtaining a new image from sensor 150, as, for example, every 15 milliseconds, at box 152. At box 154 the image is correlated with a filter selected based on exogenous data. As noted above, and during initial approach, the target spacecraft may not be sufficiently visible to perform correlations due to the intervening distance between the two spacecraft. The resulting target aimpoint from this correlation at box 154 is used to create a sub-image S at box 156. This sub-image S could be, for example, a 25×25 pixel region centered on the correlated target aimpoint from the 256×256 sensor image. The pixel data of S is averaged at box 158 to find the mean pixel value A. Similar algorithms could be used to find A, such as histogram equalization performed on the area of interest S. Box 160 shows a calculation wherein camera gain is set as a function of A. An example of this function would be $G=c*A$ where c is a constant and G is the sensor gain. Another function may be a lookup table based on known sensor characteristics to optimize sensor gain based on A. Box 162 shows camera exposure as a function of A. One example of this function would be $CE=c*A$, where c is a constant and SE is the sensor exposure time. Another example is a function wherein a lookup table is used based on known sensor characteristics to optimize sensor exposure time.

Figure 33:
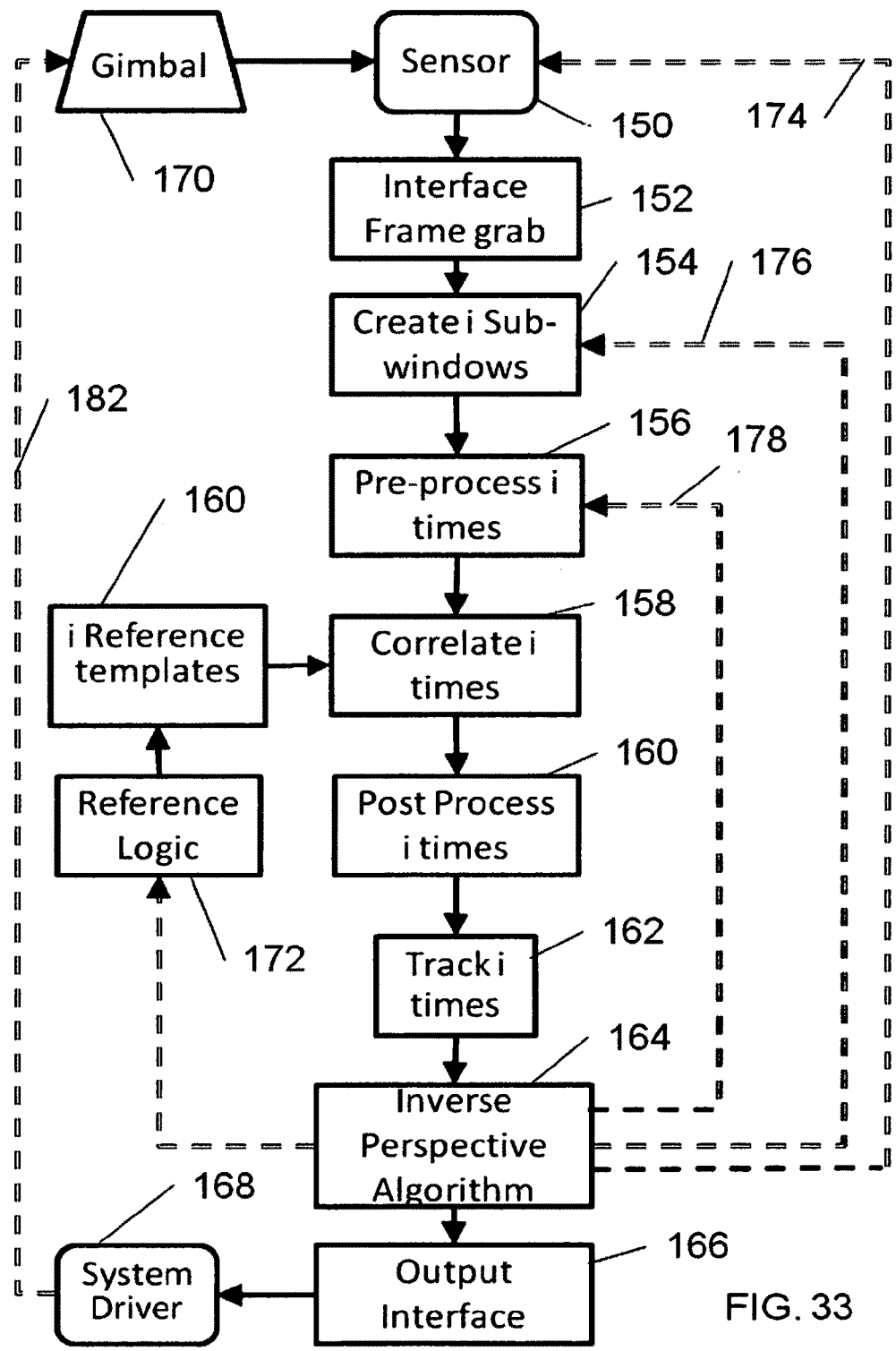
FIG. 33 shows a data flow path of the present invention.

FIG. 33 shows a data flow path of the basic invention, with the addition of sub-windows, multiple tracked target features, an inverse perspective algorithm to calculate target 6 degree-of-freedom pose and multiple feedback loops among components of an embodiment of the instant invention. Block 150 is the sensor, which captures some form of imagery of the target. As noted, one example of a sensor would be a 1024×1024 pixel 12 bit camera. While such a 12 bit camera may be used, a 16, 32 or even 64 bit camera having a 1024×1024 pixel array may also be used, with Applicants method of data reduction as described above down to 4 bits per pixel used to reduce memory storage requirements for the reference filters. Sensor 150 is coupled at block 152 to a camera interface and frame grabbing module. At this step, the imagery from the sensor is captured at a selected rate, for example every 15 milliseconds. This sensor data is stored so as to be accessed by the rest of the system. At block 154 sub-windows are created within the captured image. If, for example, the full sensor image is a pixel array of 1024×1024 pixels, and the system only operates on 256×256 pixel imagery, then a sub-window of 256×256 pixels around a target feature of interest is copied from the full sensor image. For an embodiment of the invention that tracks I number of target features of interest simultaneously, I sub-windows must be copied from the full sensor image and stored for easy access by the rest of the system.

Block 156 is a pre-processor which takes each of the I sub-window images and enhances them based on several parameters to optimize the performance of correlation of target features. Because pre-processing is performed on each sub-window independently, a set of parameters must be optimized for each sub-window. This pre-processing can be any of a number of standard image processing algorithms, but for example could be contrast stretching or unsharp mask. Contrast stretching seeks to expand the dynamic range of the sub-window to fill all the bits available. Unsharp mask seeks to enhance edges of target features, making the correlation process more robust. The extent of contrast stretching and enhancing of edges is adjusted until the best correlation peak is obtained. Block 158 is the correlation process as described above, and which compares the incoming sub-windows to stored reference templates or filters from block 160. These reference templates are designed such that when a target feature of interest is in the sub-window, the correlation process produces a correlation peak indicating the location of the target feature, by the peaks location, and the degree of similarity by the correlation peaks intensity. Various correlation metrics can also be used to evaluate the similarity between reference template and target feature. These metrics include, but are not limited to, correlation peak intensity, peak-to-secondary peak ratio, and peak-to-noise ratio. The process of correlation on each sub-window produces a correlation plane for each target feature.

Block 160 is a post processing step performed separately on each resultant correlation plane. Post processing can include any image processing algorithms that enhance the correlation peak for easier identification of location. Block 162 represents the identification of i target feature locations based on the location of i correlation peaks. This target location data is stored for use by the rest of the system.

Block 164 is an inverse perspective algorithm. This algorithm takes the location of i target features along with knowledge in 3D space of the location of these features relative to an origin, and produces X, Y, Z, Roll, Pitch, and Yaw information of the target relative to the sensor frame of reference. This target data is stored for use by the rest of the system, and is also output for the user.

Block 166 is an interface to output target X,Y,Z, Roll, Pitch, and Yaw information to the user. Block 168 is a system driver which takes the data from Block 166 and formats it to drive the Gimbal of Block 170 so that the target will remain centered in the sensor field of view. In spacecraft applications, this output may be used to control thrusters that control a spacecraft's speed and bearing relative to a target spacecraft, or to guide one spacecraft toward another spacecraft. Block 172 is reference template logic. This logic uses target pose data from Block 164 and target location data in each sub-window from Block 162 to determine what set of reference templates to correlate with the next set of sub-windows captured on the next iteration of the system. Loop 174 sets Sensor parameters such as sensor gain and exposure time based on current performance of the system to further optimize system performance. As noted above, these parameters may be varied within their respective ranges until a best correlation peak is achieved. Loop 176 sets Sub-window locations based on the location of currently tracked target features, to maintain each target feature in the center of its respective sub-window. Loop 178 sets pre-processing parameters to optimize the performance of the system. Loop 180 uses results of the inverse perspective algorithm and the location of each target feature in its respective sub-window to determine the next set of reference templates to use for correlation of the i features of interest. Loop 182 uses the location output from the system driver to drive a gimbal or other pointing system, where the mission application so requires.

Figure 34:
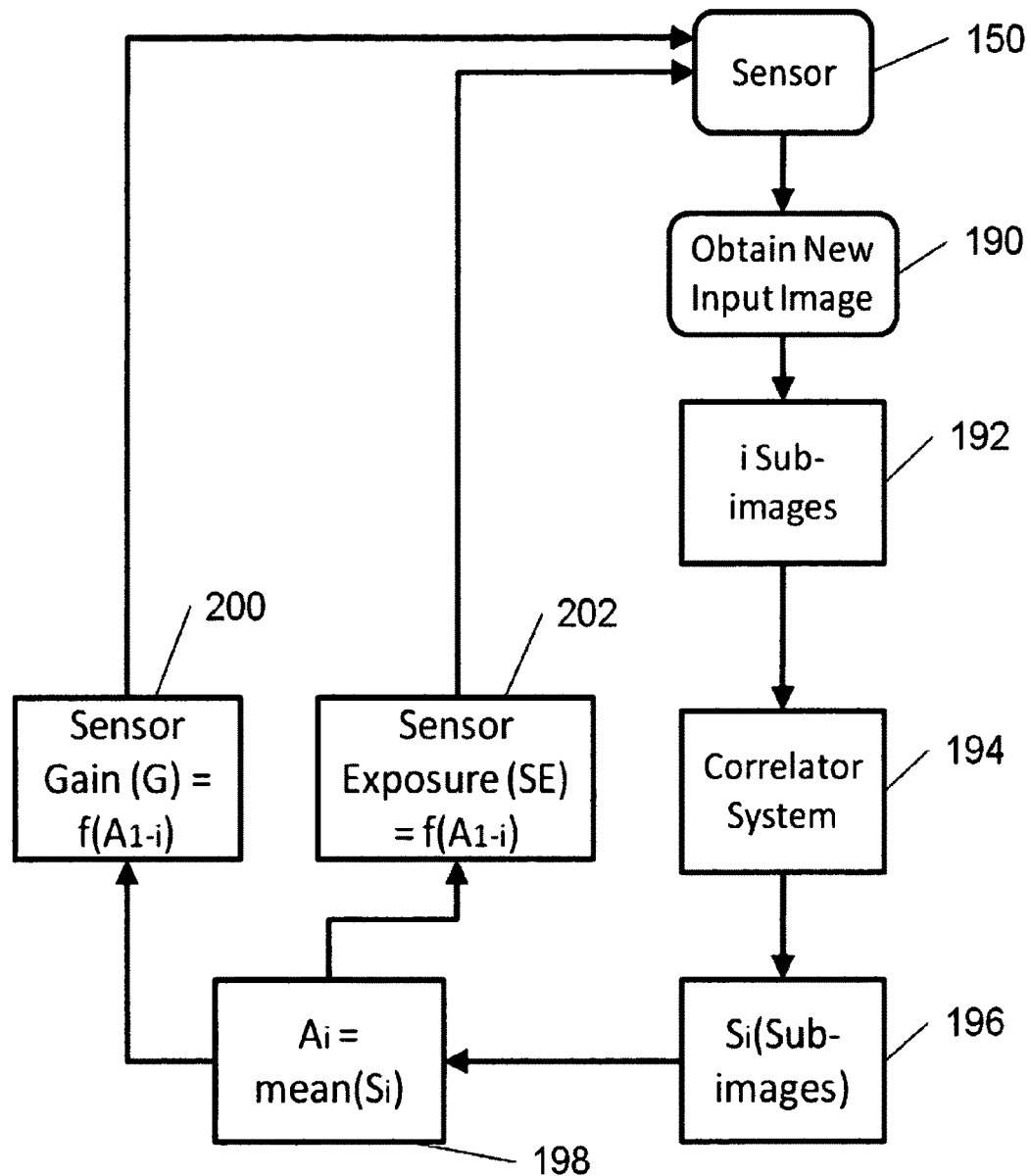
FIG. 34 illustrates a feedback loop for varying gain and exposure of a sensor.
Figure 35:
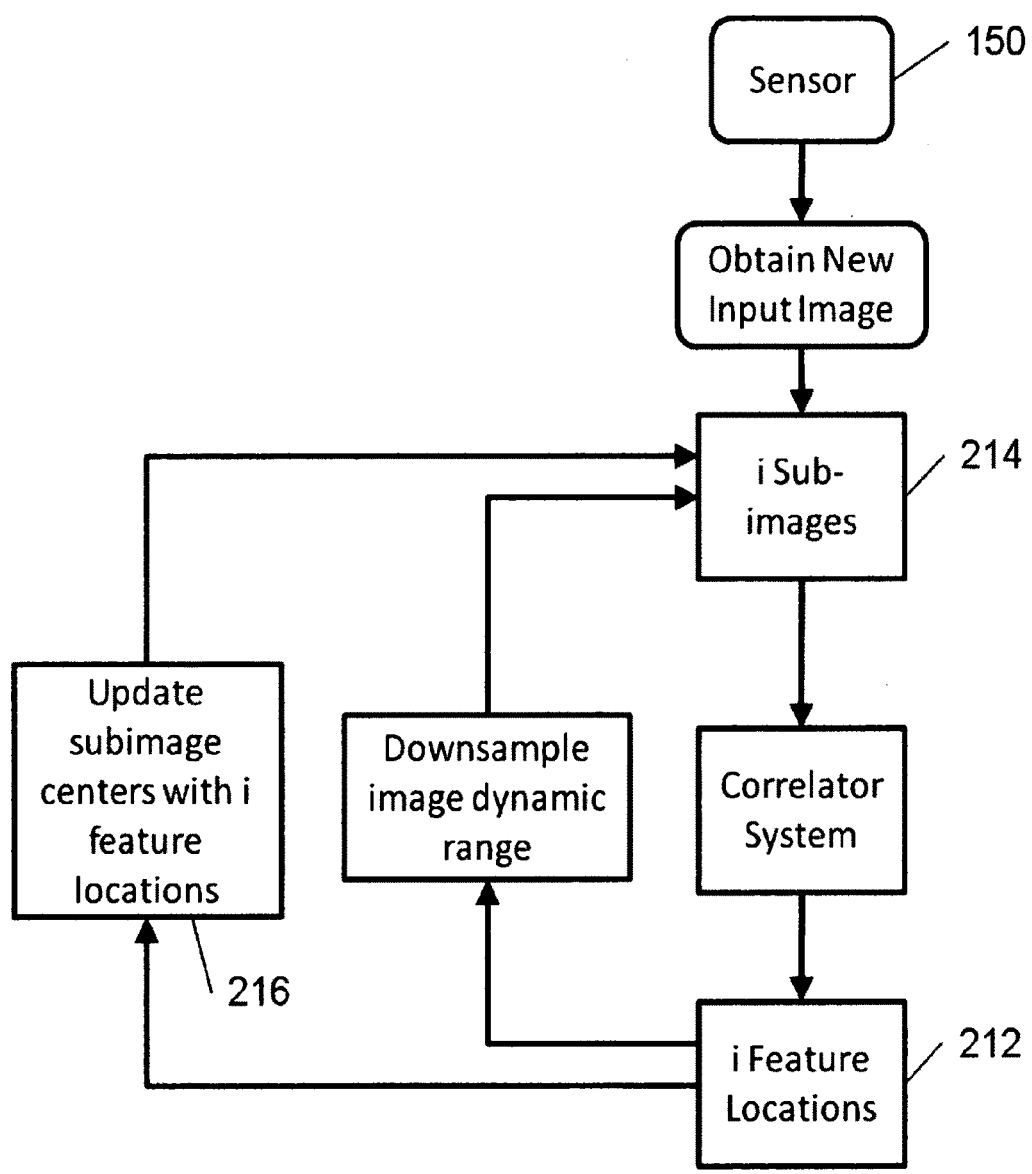
FIG. 35 illustrates a feedback loop for varying location and dynamic range of sub-images.
Figure 36:
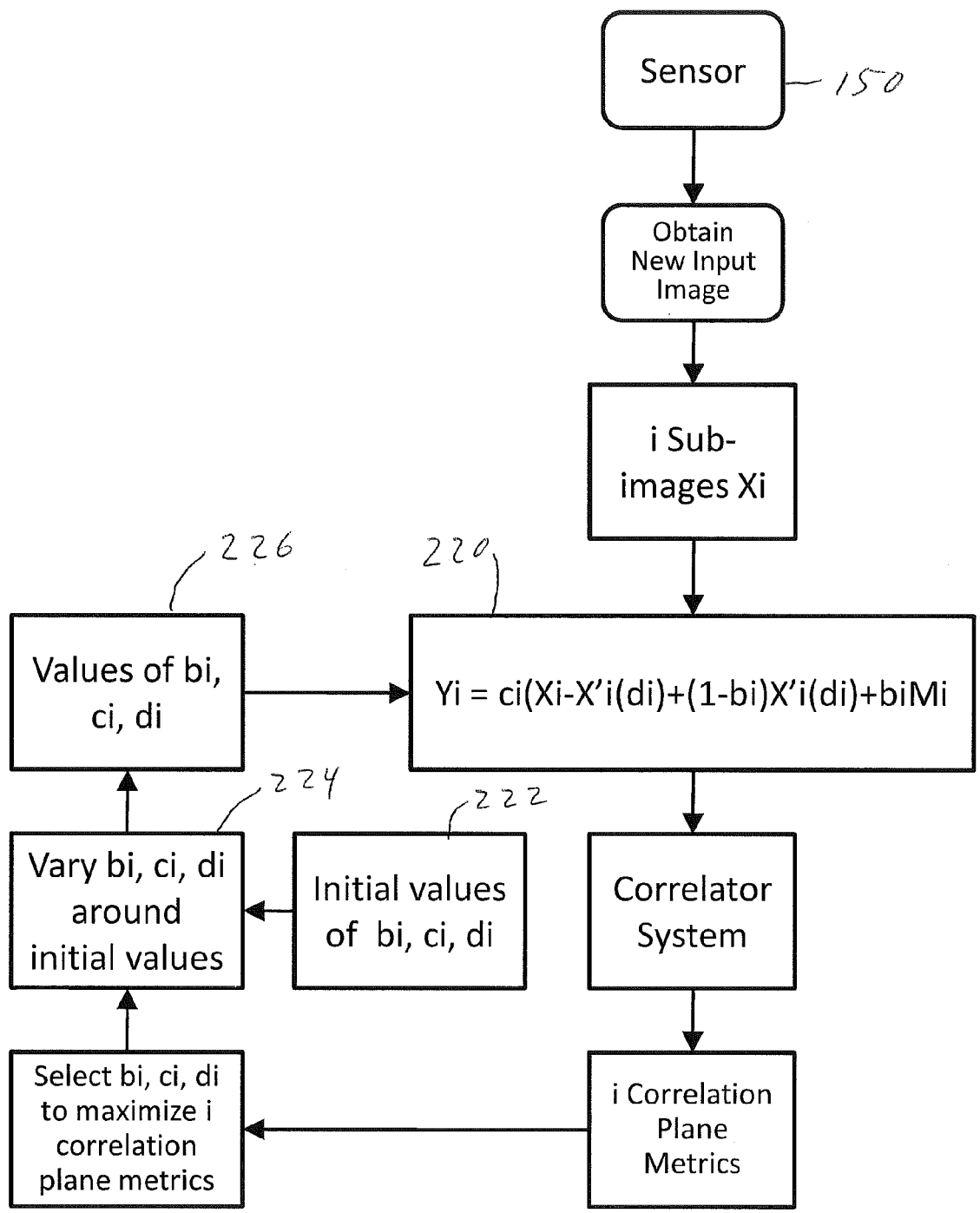
FIG. 36 illustrates a feedback loop for controlling preprocessing parameters.

FIG. 34 shows a representative implementation of a feedback loop that may be used to control gain and exposure settings of sensor 150 based on multiple areas of interest in the sensor image. This is accomplished by initially obtaining a new image from sensor 150, as, for example, every 15 milliseconds, at box 190. At Box 192 a series of i sub-images are created from the full sensor image based on the location of the i target features of interest. At box 194 the i images are correlated with i filters selected based on the exogenous data obtained as described for FIG. 1. The resulting target aim-points from these correlations are used to create sub-images Si at box 196. These sub-images could be, for example, a 25×25 pixel regions centered on the correlated target aim-points from the 256×256 sensor images. The pixel data of Si is averaged to find the mean pixel value Ai in box 198. Similar algorithms could be used to find Ai, such as histogram equalization performed on the area of interest Si. Box 200 shows camera gain as a function of A1 through Ai. An example of this function would be G=c*mean(A1, A2, ..., Ai), where c is a constant and G is the sensor gain. Another function would be a lookup table based on known sensor characteristics to optimize sensor gain based on Ai. Box 202 shows camera exposure as a function of A1 through Ai. An example of this function would be CE=c*mean(A1, A2, ..., Ai) where c is a constant and SE is the sensor exposure time. Another function would be a lookup table based on known sensor characteristics to optimize sensor exposure time. FIG. 35 shows a representative implementation of a feedback loop which may be used to control the location and dynamic range of sub-images centered on each target feature of interest. Each feature location of an input image found in Block 210 and stored in Block 212 is used to update the sub-image centers in Block 214. The logic for this is represented by Block 216, and simply places the center of the i sub-images at the center of the i target features of interest. FIG. 36 shows a representative implementation of a feedback loop that may be used to control pre-processing parameters to optimize the performance of the system. The equation shown in Block 220 is that of a typical unsharp mask algorithm. Other equations to do the same function in a similar way could be used here. Because i correlations are being done on i target features, i sets of pre-processing parameters must be stored and updated. Block 222 provides initial values of bi, ci, and di to be loaded in at the beginning of the process. Block 224 varies the bi, ci, and di around the initial values based on the results of the last correlation results. Block 226 loads the current values of bi, ci, and di into block 220 to be used by the pre-processing algorithm. The process is continued iteratively until an optimum set of parameters is found.

Having thus described my correlator system and the manner of its use, it should be apparent that incidental changes may be made thereto by those skilled in the relevant arts that fairly fall within the scope of the following appended claims, wherein we claim:

1. A method for acquiring and tracking a target object comprising:
  constructing a plurality of complex composite digital correlation filters wherein some of said complex composite digital correlation filters are sensitive only to range of said target object, and others of said complex composite digital correlation filters are sensitive to orientation and range of said target object,
  obtaining a train of digital images,
  processing said digital images of said train of digital images for digital correlation,
  using a digital correlator, and where said target object is initially at a longer range, correlating processed images of said train of digital images with at least some of those said complex composite digital correlation filters that are sensitive only to range of said target object, and after a target object correlation is found,
  predictively selecting for correlation, said ones of said plurality of complex composite digital correlation filters based on at least range, pose and movement of said target object,
  tracking said target object in said at least range, pose and movement using predictively selected ones of said plurality of complex composite digital correlation filters sensitive to range and orientation of said target object.

2. The method as set forth in claim 1 further comprising:
  constructing said complex composite digital correlation filters sensitive only to range as complex composite digital correlation filters sensitive to a full view of said target object,
  constructing said complex composite digital correlation filters sensitive to orientation and range as complex composite digital correlation filters sensitive only to selected portions of said target object.

3. The method as set forth in claim 2 wherein said creating others of said complex composite digital correlation filters being sensitive to selected portions of said target object further comprises using from about 3 to 9 said portions of said target object.

4. The method as set forth in claim 1 wherein said obtaining a train of digital images further comprises obtaining a full frame image containing said target object, and reducing a number of pixels in said full frame image during said processing of said digital images.

5. The method as set forth in claim 4 wherein said reducing a number of pixels in said full frame image further comprises using only a portion of said full frame image, said portion of said full frame image containing said target object.

6. The method as set forth in claim 4 wherein said reducing a number of pixels in said full frame image further comprises at least one of averaging and sampling of pixels of said full frame image.

7. The method as set forth in claim 4 further comprising interpolating over a correlation peak for locating said correlation peak with sub-pixel accuracy.

8. The method as set forth in claim 1 wherein said creating a plurality of complex composite digital correlation filters further comprises, for each complex composite digital correlation filter of said plurality of complex composite digital correlation filters;

developing a full resolution complex composite digital correlation filter wherein pixels thereof are defined by a relatively high resolution digital value, reducing said high resolution digital value of said pixels to a lower resolution digital value to create a digitally smaller, lower resolution said complex composite digital correlation filter.

9. The method as set forth in claim 8 wherein said reducing said high resolution digital value to a respective said lower resolution digital value further comprises:

creating a complex plane map including a unit circle wherein amplitude 0 is digitally represented as 0+0i at the origin of the complex plane map, and amplitude 1 and phase is represented by 15 values equally spaced around a periphery of said unit circle, defining 16 regions, one region around said origin, and 15 regions between said origin and said 15 values around said periphery of said unit circle, said 16 regions each assigned one exclusive 4-bit digital value of 16 4-bit digital values, on a pixel-by-pixel basis, mapping said high resolution digital value of said pixels of said full resolution complex composite digital correlation filter to one of said 16 regions, populating respective pixels of said lower resolution complex composite digital correlation filter with respective 4-bit digital values resulting from mapped said high resolution values.

10. The method as set forth in claim 9 further comprising substituting said high resolution digital values with said 16 4-bit digital values in accordance with table 1.

11. The method as set forth in claim 8 wherein said obtaining a train of digital images further comprises obtaining a full frame image containing said target object, and reducing a number of pixels in said full frame image.

12. The method as set forth in claim 8 wherein said predictively selecting for correlation, said ones of said plurality of complex composite digital correlation filters based on at least range, pose and movement of said target object further comprises arranging said plurality of lower resolution complex composite digital correlation filters into a 4 dimensional filter space wherein the moving of said target object correlations in said at least range, pose and movement through said 4 dimensional filter space determines selection of a next said lower resolution complex composite correlation filter for use in correlations with said processed images of said target object.

13. The method as set forth in claim 12 wherein said arranging said plurality of lower resolution complex composite digital correlation filters into a 4 dimensional filter space further comprises organizing said filter space so that adjacent said lower resolution complex composite correlation filters in any of 4 dimensions provides contiguous orientations of roll, pitch, yaw and range.

14. The method as set forth in claim 13 wherein said tracking said target object further comprises:

considering, in a high speed digital environment, only a portion of said 4 dimensional filter space containing said target object correlations, using a history of trajectory of said target object correlations with said target object through said portion of said 4 dimensional filter space, extrapolating a future trajectory of said target object correlations through said portion of said filter space, allowing fast selection for correlation those said lower resolution complex composite digital correlation filters lying along an extrapolated said future trajectory of said target object correlations, as said target object correlations move through said portion of said 4 dimensional filter space, adjusting location of said portion of said 4 dimensional filter space in said high speed environment to maintain said target object correlations generally within an adjusted said portion of said 4 dimensional filter space.

15. The method as set forth in claim 14 wherein said adjusting said portion of said 4 dimensional filter space further comprises adjusting said portion of said 4 dimensional filter space to maintain said target object generally in a center of said portion of said 4 dimensional filter space.

16. The method as set forth in claim 14 wherein said tracking further comprises obtaining a said correlation within a time interval of about 15 milliseconds of obtaining a digital image from said train of digital images, allowing operation of said tracking to occur at a rate of at least 30 frames per second.

17. The method as set forth in claim 16 further comprising obtaining six degree of freedom information about said target object during said time interval of about 15 milliseconds, allowing said tracking to occur at a rate of at least 30 frames per second.

18. The method as set forth in claim 1 further comprising:

using a digital camera to capture said train of said digital images, and wherein said processing said digital images further comprises processing said digital images in a manner that optimizes correlation peaks.

19. The method as set forth in claim 18 wherein said processing said digital images in a manner that optimizes correlation peaks further comprises preprocessing of said digital images including using at least one of contrast stretching and an unsharp mask.

20. The method as set forth in claim 18 wherein said processing said digital images for optimizing correlation peaks further comprises providing feedback to said camera, said feedback controlling at least contrast, brightness, gamma and gain.

21. The method as set forth in claim 20 wherein said providing feedback further comprises varying at least one of said contrast, brightness, gamma and gain in said processed digital images until a strongest correlation peak is found.

22. The method as set forth in claim 18 wherein said processing said images for optimizing correlation peaks further comprises providing feedback to said camera including providing pan and tilt commands for keeping said target object in a field of view of said digital camera, and tracking said target object.

23. The system as set forth in claim 22 further comprising developing pan and tilt commands for a camera obtaining said train of digital images based on movement of said target object correlations through said filter space, keeping said target object in a field of view of said camera.

24. A method for acquiring and tracking a target object comprising:

constructing a plurality of complex composite digital correlation filters wherein some of said complex composite digital correlation filters are sensitive only to range of said target object, and others of said complex composite digital correlation filters are sensitive to orientation and range of said target object, obtaining a train of digital images, processing discrete images of said train of digital images for use in a digital correlator, using a digital correlator, initially correlating processed said digital images with those said complex composite digital correlation filters that are sensitive only to range of said target object, and after a target object correlation indicating range of said target object is found, using said complex composite digital correlation filters that are sensitive to range and orientation of said target object, for tracking said target object in at least range and orientation using predictively selected ones of said complex composite digital correlation filters that are sensitive to range and orientation of said target object.

25. The method as set forth in claim 24 wherein said constructing a plurality of complex composite digital correlation filters further comprises organizing said plurality of complex composite digital correlation filters into a six degree of freedom filter space wherein movement in any of 6 dimensions of said 6 degree of freedom filter space provides contiguous orientations of roll, pitch, yaw, direction of movement and X and Y location said target object correlations so that said target object can be contiguously tracked in six degrees of freedom.

26. The method as set forth in claim 25 further comprising considering for correlation only those said complex composite digital correlation filters in a neighborhood of said filter space that immediately surrounds said target object correlations, and selecting a size of said neighborhood depending on speed of said target object correlations through said filter space neighborhood.

27. The method as set forth in claim 25 further comprising predictively selecting a next said complex composite digital correlation filter based on movement of said target object correlations through said filter space.

28. A method for acquiring and tracking a target object comprising:
constructing a plurality of complex composite digital correlation filters wherein some of said complex composite digital correlation filters are sensitive only to said target object at longer ranges, and others of said complex composite digital correlation filters are sensitive to orientation and range of said target object,
obtaining a train of digital images,
processing discrete images of said train of digital images for use in a digital correlator and in a manner that optimizes correlation peaks with said target object,
using a digital correlator, and where said target object is initially at said longer ranges, correlating said train of digital images with at least some of those said complex composite digital correlation filters that are sensitive only to longer ranges of said target object, and after a target object correlation is found,
using a determined range, predictively selecting for correlation ones of said plurality of complex composite digital correlation filters based on at least range, pose and movement of said target object,
tracking said target object in said at least range, pose and movement using predictively selected said ones of said plurality of complex composite digital correlation filters sensitive to range and orientation of said target object.

29. The method as set forth in claim 28 wherein said constructing a plurality of complex composite digital correlation filters further comprises:
for each said complex composite digital correlation filter of said plurality of complex composite digital correlation filters, developing a high resolution complex composite correlation filter wherein each pixel thereof has a digital value greater than 4 bits,
mapping each pixel of said high resolution complex composite correlation filter to a respective pixel of a corresponding low resolution complex composite digital correlation filter,
using corresponding low resolution complex composite digital correlation filters in correlations of said digital correlator with said processed images of said train of digital images.

30. The method as set forth in claim 29 wherein said mapping each said pixel of said high resolution complex composite correlation filter to a respective said pixel of a corresponding low resolution complex composite digital correlation filter further comprises converting each said high resolution pixel of said high resolution complex composite correlation filter to a 4 bit value, and populating respective said pixels of said low resolution complex composite digital correlation filters with respective said 4 bit values each representative of a corresponding said pixel of said high resolution complex composite digital correlation filter.

31. The method as set forth in claim 30 wherein said mapping each high resolution pixel further comprises:
creating a complex plane map including a unit circle wherein amplitude 0 is digitally represented as 0+0i at the origin of the complex plane map, and amplitude 1 and phase is represented by 15 values equally spaced around a periphery of said unit circle,
defining 16 regions, one region around said origin, and 15 regions between said origin and said 15 values around said periphery of said unit circle, said 16 regions each assigned one exclusive said 4-bit digital value of 16 said 4-bit digital values,
on a pixel-by-pixel basis, mapping said high resolution digital value of said pixels of said high resolution complex composite digital correlation filter to one of said 16 regions,
populating said respective pixels of said low resolution complex composite digital correlation filter with said respective 4-bit digital values resulting from mapped said high resolution values.

\* \* \* \* \*